US008028133B2

(12) United States Patent
Dice et al.

(10) Patent No.: US 8,028,133 B2
(45) Date of Patent: *Sep. 27, 2011

(54) GLOBALLY INCREMENTED VARIABLE OR CLOCK BASED METHODS AND APPARATUS TO IMPLEMENT PARALLEL TRANSACTIONS

(75) Inventors: David Dice, Foxboro, MA (US); Nir N. Shavit, Cambridge, MA (US); Ori Shalev, Givat Shmuel (IL); Mark Moir, Hampton, NH (US)

(73) Assignee: Oracle America, Inc., Redwood City, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 11/699,802

(22) Filed: Jan. 30, 2007

(65) Prior Publication Data

US 2007/0239943 A1    Oct. 11, 2007

Related U.S. Application Data

(63) Continuation-in-part of application No. 11/475,814, filed on Jun. 27, 2006, now Pat. No. 7,669,015.

(60) Provisional application No. 60/789,483, filed on Apr. 5, 2006, provisional application No. 60/775,564, filed on Feb. 22, 2006, provisional application No. 60/775,580, filed on Feb. 22, 2006.

(51) Int. Cl.
*G06F 13/00* (2006.01)

(52) U.S. Cl. .......................... 711/152; 711/163; 711/173

(58) Field of Classification Search .................. 711/152, 711/153, 173
See application file for complete search history.

(56) References Cited

U.S. PATENT DOCUMENTS

| 5,301,290 | A | | 4/1994 | Tetzlaff et al. |
| 5,596,754 | A | | 1/1997 | Lomet |
| 5,649,200 | A | | 7/1997 | Leblang et al. |
| 5,950,199 | A | * | 9/1999 | Schmuck et al. .................. 707/8 |
| 5,956,731 | A | | 9/1999 | Bamford et al. |
| 5,987,506 | A | * | 11/1999 | Carter et al. ................... 709/213 |
| 6,101,590 | A | * | 8/2000 | Hansen ......................... 711/203 |
| 6,148,377 | A | * | 11/2000 | Carter et al. ................... 711/147 |
| 6,393,437 | B1 | | 5/2002 | Zinda et al. |
| 6,757,893 | B1 | | 6/2004 | Haikin |

(Continued)

OTHER PUBLICATIONS

Office Action issued in U.S. Appl. No. 11/475,814, dated Jan. 22, 2009.

(Continued)

*Primary Examiner* — Reba I Elmore
(74) *Attorney, Agent, or Firm* — Brooks Kushman P.C.

(57) ABSTRACT

The present disclosure describes a unique way for each of multiple processes to operate in parallel and use the same shared data without causing corruption to the shared data. For example, during a commit phase, a corresponding transaction can attempt to increment a globally accessible version information variable and store a current value of the globally accessible version information variable for updating version information associated with modified data regardless of whether an associated attempt by the corresponding transaction to modify the globally accessible version information variable was successful. As an alternative mode, a corresponding transaction can merely read and store a current value of the globally accessible version information variable without attempting to update the globally accessible version information variable before such use. In yet another application, a parallel processing environment implements a combination of both aforementioned modes depending on a self-abort rate of the transaction.

20 Claims, 11 Drawing Sheets

U.S. PATENT DOCUMENTS

| | | | |
|---|---|---|---|
| 6,810,470 | B1 | 10/2004 | Wiseman et al. |
| 6,826,570 | B1 | 11/2004 | Eshel et al. |
| 7,313,794 | B1 | 12/2007 | Ansari |
| 7,395,263 | B2 | 7/2008 | McKenney |
| 7,467,378 | B1 | 12/2008 | Sobel |
| 7,536,517 | B2 | 5/2009 | Harris |
| 2004/0117531 | A1 | 6/2004 | McKenney |
| 2005/0038961 | A1 | 2/2005 | Chen |
| 2006/0106996 | A1 | 5/2006 | Ahmad et al. |
| 2006/0161919 | A1 | 7/2006 | Onufryk et al. |
| 2006/0236039 | A1 | 10/2006 | Golander |
| 2007/0124546 | A1 | 5/2007 | Blanchard et al. |

OTHER PUBLICATIONS

Response to Office Action filed in U.S. Appl. No. 11/475,814, dated Apr. 20, 2009.
Office Action issued in U.S. Appl. No. 11/475,262, dated Dec. Dec. 9, 2008.
Response to Office Action filed in U.S. Appl. No. 11/475,262, dated Apr. 7, 2009.
Office Action issued in U.S. Appl. No. 11/475,262, dated Jul. 8, 2009.
Chris Purcell et al., Brief Announcement; Implementing Multi-Word Atomic Snapshots on Current Hardware, Jul. 25-28, 2004, p. 1, PODC '04.
Herlihy, M., Moss, E., "Transactional Memory: Architectural Support for Lock-Free Data Structures", Proceedings of the Twentieth Annual International Symposium on Computer Architecture, 1993, pp. 1-12.
Rajwar, R., Herlihy, M., Lai, K., "Virtualizing Transactional Memory", ISCA '05: Proceedings of the 32nd Annual International Symposium on Computer Architecture, Washington, DC, IEEE Computer Society, 2005, pp. 494-505.
Ananian, C.S., Asanovic, K., Kuszmaul, B.C., Leiserson, C.E., Lie, S., "Unbounded Transactional Memory", HPCA '05: Proceedings of the 11th International Symposium on High-Performance Computer Architecture, Washington, DC, IEEE Computer Society, 2005, pp. 316-327.
Hammond, L., Wong, V., Chen, M., Carlstrom, B.D., Davis, J.D., Hertzberg, B., Prabhu, M.K., Wijaya, H., Kozyrakis, C., Olukotun, K., "Transactional Memory Coherence and Consistency", ISCA '04: Proceedings of the 31st Annual International Symposium on Computer Architecture, Washington, DC, IEEE Computer Society, 2004.
Ennals, R., "Software Transactional Memory Should Not Be Obstruction-Free", www.cambridge,intel-research.net/rennals/notlockfree.pdf, 2005, pp. 1-10.
Fraser, K., Harris, T., "Concurrent Programming Without Locks", www.cl.cam.ac.uk/Research/SRG/netos/papers/2004-cpwl-submission.pdf, 2004, pp. 1-48.
Herlihy, M., "SXM: C# Software Transactional Memory", http://www.cs.brown.edu/~mph/SXM/README.doc, 2005.
Herlihy, M., Luchangco, V., Moir, M., Scherer III, W.N., "Software Transactional Memory for Dynamic-Sized Data Structure", Proceedings of the 22nd Annual ACM Symposium on Principles of Distributed Computing, 2003.
Marathe, V.J., Scherer III, W.N., Scott, M.L., "Design Tradeoffs in Modem Software Transactional Memory Systems", LCR '04: Proceedings of the 7th Workshop on Workshop on Languages, Compilers, and Run-Time Support for Scalable Systems, New York, NY, ACM Press, 2004.
Marathe, V.J., Scherer III, W.N., Scott, M.L., "Adaptive Software Transactional Memory", Proceedings of the 19th International Symposium on Distributed Computing, Cracow, Poland, 2005, pp. 354-368.
Moir, M., "Hybrid Transactional Memory", Technical Report Archivist 2004-0661, Sun Microsystems Research, 2004, pp. 1-15.
Saha, B., ADL-Tabatabai, A.R., Hudson, R.L., Minh, C.C., Hertzberg, B., "McRT-STM: A High Performance Software Transactional Memory System for a Multi-Core Runtime", PPoPP '06, Mar. 29-31, 2006, New York, NY, pp. 187-192.
Shalev, O., Shavit, N., "Predictive Log-Synchronization", EuroSys 2006, Apr. 18-21, 2006, Leuven, Belgium, pp. 305-315.
Shavit, N., Touitou, D., "Software transactional memory", Distributed Computing 10(2), 1997, p. 99-116.
Welc, A., Jagannathan, S., Hosking, A.L., "Transactional Monitors for Concurrent Objects", Proceedings of the European Conference on Object-Oriented Programming, vol. 3086 of Lecture Notes in Computer Science, Springer Verlag, 2004, pp. 519-542.
Ananian, C.S., Rinard, M., "Efficient Object-Based Software Transactions", Proceedings of Synchronization and Concurrency in Object-Oriented Languages (SCOOL), ACM, 2005.
Kumar, S., Chu, M., Hughes, C.J., Kundu, P., Nguyen, A., "Hybrid Transactional Memory", PPoPP 2006, Mar. 29-31, 2006, New York, NY, pp. 209-220.
Harris, T., Fraser, K., "Language Support for Lightweight Transactions", SIGPLAN Not. 38(11), 2003, pp. 388-402.
Dice, D., Shavit, N., "What Really Makes Transactions Faster?", TRANSACT06 ACM Workshop, 2006.
Afek, Y., Attiya, H., Dolev, D., Gafni, E., Merritt, M., Shavit, N., "Atomic Snapshots of Shared Memory", J. ACM 40(4), 1993, pp. 873-890.
Agesen, O., Detlefs, D., Garthwaite, A., Knippel, R., Ramakrishna, Y.S., White, D., "An Efficient Meta-lock for Implementing Ubiquitous Synchronization", ACM SIGPLAN Notices 34(10), 1999, pp. 207-222.
Dice, D., "Implementing Fast Java Monitors with Relaxed-Locks", Proceedings of the Java Virtual Machine Research and Technology Symposium (JVM '01), Monterey, California, Apr. 23-24, 2001, pp. 79-90.
Bloom, B.H., "Space/Time Trade-offs in Hash Coding with Allowable Errors", Communications of the ACM, vol. 13, No. 7, Jul. 1970, pp. 422-426.
Boehm, H.J., "Space Efficient Conservative Garbage Collection", SIGPLAN Conference on Programming Language Design and Implementation, 1993, pp. 197-206.
Michael, M.M., "Hazard Pointers: Safe Memory Reclamation for Lock-Free Objects", IEEE Trans. on Parallel and Distributed Systems, vol. 15, No. 6, 2004, pp. 491-504.
Herlihy, M., Luchangco, V., Moir, M., "The Repeat Offender Problem: A Mechanism for Supporting Dynamic-Sized, Lock-Free Data Structures", Proceedings of the 16th International Symposium on Distributed Computing, vol. 2508, Springer-Verlag Heidelberg, 2002, pp. 339-353.
Hart, T.E., McKenney, P.E., Brown, A.D., "Making Lockless Synchronization Fast: Performance Implications of Memory Reclamation", IEEE, 2006.
Fraser, K., "Practical lock-freedom", Technical Report, No. 579, University of Cambridge, Computer Laboratory, Feb. 2004, pp. 1-116.
Hanke, S., "The Performance of Concurrent Red-Black Tree Algorithms", Lecture Notes in Computer Science 1668, 1999, pp. 286-300.
Rajwar, R., Hill, M., "Transactional Memory Online", http://www.cs.wisc.edu/trans-memory, 2006.
Appeal Brief dated Jan. 5, 2010 for U.S. Appl. No. 11/475,262, 16 pgs.
Non-Final Office Action dated Nov. 9, 2010 for U.S. Appl. No. 11/475,716, 26 pgs.
Amendment filed Feb. 4, 2011 in response to Non-Final Office Action dated Nov. 9, 2010, for U.S. Appl. No. 11/475,716, filed Jun. 27, 2006, 10 pgs.
Non-Final Office Action dated Dec. 8, 2010 for U.S. Appl. No. 11/475,604, filed Jun. 27, 2006, 28 pgs.
Final Office Action dated Apr. 5, 2011 for U.S. Appl. No. 11/475,716, filed Jun. 27, 2006, 20 pgs.
Non-Final Office Action dated Dec. 8, 2010, for U.S. Appl. No. 11/475,604, filed Jun. 27, 2006, 28 pgs.
Response to Non-Final Office Action dated Dec. 8, 2010 for U.S. Appl. No. 11/475,604, filed Mar. 17, 2011, 13 pgs.
Response dated Jun. 30, 2011 to Final Office Action dated Apr. 5, 2011 foe U.S. Appl. No. 11/475,716, 10 pgs.
Final Office Action dated May 23, 2011 for U.S. Appl. No. 11/475,604, 20 pgs.
Lev et al., "Fast read sharing mechanism for software transactional memory", 23 rd Annual ACM SIGACT—SIGOPS Symposium on Principles of Distributed Computing (PODC 2004), Jul. 2004.

* cited by examiner

GLOBALLY INCREMENTED VARIABLE OR CLOCK BASED METHODS AND APPARATUS TO IMPLEMENT PARALLEL TRANSACTIONS

RELATED APPLICATIONS

This application is a continuation-in-part of application Ser. No. 11/475,814, filed Jun. 27, 2006, which claims the benefit of U.S. Provisional Application No. 60/789,483, filed Apr. 5, 2006, the entire teachings of which are incorporated herein by this reference, U.S. Provisional Application No. 60/775,564, filed Feb. 22, 2006, the entire teachings of which are incorporated herein by this reference, and U.S. Provisional Application No. 60/775,580, filed Feb. 22, 2006, the entire teachings of which are incorporated herein by this reference.

BACKGROUND

There has been an ongoing trend in the information technology industry to execute software programs more quickly. For example, there are various conventional advancements that provide for increased execution speed of software programs. One technique for increasing execution speed of a program is called parallelism. Parallelism is the practice of executing or performing multiple things simultaneously. Parallelism can be implemented on multiple levels, from executing multiple instructions at the same time, to executing multiple threads at the same time, to executing multiple programs at the same time, and so on.

Instruction Level Parallelism or ILP is parallelism at the lowest level and involves executing multiple instructions simultaneously. Processors that exploit ILP are typically called multiple-issue processors, meaning they can issue multiple instructions in a single clock cycle to the various functional units on the processor chip.

There are different types of conventional multiple-issue processors. One type of multiple-issue processor is a super-scalar processor in which a sequential list of program instructions are dynamically scheduled. A respective processor determines which instructions can be executed on the same clock cycle, and sends them out to their respective functional units to be executed. This type of multi-issue processor is called an in-order-issue processor since issuance of instructions is performed in the same sequential order as the program sequence, but issued instructions may complete at different times (e.g., short instructions requiring fewer cycles may complete before longer ones requiring more cycles).

Another type of multi-issue processor is called a VLIW (Very Large Instruction Width) processor. A VLIW processor depends on a compiler to do all the work of instruction reordering and the processor executes the instructions that the compiler provides as fast as possible according to the compiler-determined order. Other types of multi-issue processors issue out of order instructions, meaning the instruction issue order is not be the same order as the order of instructions as they appear in the program.

Conventional techniques for executing instructions using ILP can utilize look-ahead techniques to find a larger amount of instructions that can execute in parallel within an instruction window. Looking-ahead often involves determining which instructions might depend upon others during execution for such things as shared variables, shared memory, interference conditions, and the like. When scheduling, a handler associated with the processor detects a group of instructions that do not interfere or depend on each other. The processor can then issue execution of these instructions in parallel thus conserving processor cycles and resulting in faster execution of the program. As will be discussed, certain embodiments herein are related to thread level parallelism (e.g., TLP).

Thread-level parallelism (TLP) is the parallelism inherent in an application that runs multiple threads at once. This type of parallel processing can be sometimes be found in applications written for commercial servers such as databases. By running many threads at once, applications are able to tolerate the high amounts of I/O and memory system latency their workloads can incur—while one thread is delayed waiting for a memory or disk access, other threads can do useful work.

SUMMARY

Conventional applications that support parallel processing can suffer from a number of deficiencies. For example, although easy to implement from the perspective of a software developer, coarse-grained locking techniques may provide poor performance because of limited potential parallelism. Although fine-grain lock-based concurrent software can perform exceptionally well during run-time, developing such code can be a very difficult task for a respective one or more software developers.

Techniques discussed herein deviate with respect to conventional applications such as those discussed above as well as other techniques known in the prior art. For example, embodiments herein include techniques for enhancing performance associated with transactions executing in parallel.

In general, a technique according to embodiments herein provides a unique way for each of multiple processes to operate in parallel using (e.g., based on reading, modifying, and writing to) the same shared data without causing corruption to the shared data. For example, each of multiple processes utilizes data values associated with a globally incremented variable or clock (as generated at various times) as a guideline or parameter for determining whether any dependent shared variables used to produce a respective transaction outcome were modified (by another process) when executing a respective transaction. If a respective process (executing a transaction to produce a respective transaction outcome) detects that another one or more process modifies globally shared data used by the respective transaction during a course of executing the respective transaction, the respective transaction can re-execute the transaction and abort further operations with respect to the transaction. If at commit time a respective process executing the transaction detects that there were no changes to dependent shared data used during execution of the transaction, the respective transaction can commit locally stored results in its respective "scratchpad" to the globally accessible set of shared data for use by other processes.

In one embodiment, to prevent data corruption, a computer environment includes segments of information (e.g., a groupings, sections, portions, etc. of a repository for storing version information associated with one or more globally shared data variables) that are shared by multiple processes executing in parallel. For each of the segments, the computer environment maintains a corresponding location to store a respective version value (e.g., version information) indicating a relative time (or global clock value) when the corresponding segment of globally shared data was last modified. Accordingly, other processes keeping track of version information (for accessed segments used to produce a respective transaction outcome) can identify if and when contents of the respective segment have been modified. Thus, if after execution of a corresponding transaction, a given process reads the version information associated with variables accessed during the transaction and detects that the version information changed since the outset of the transaction, the given process can abort a final process of committing its locally modified results to storage in order to prevent corruption of data.

Embodiments herein include multiple different possible modes for updating and utilizing a corresponding globally accessible variable (e.g., counter, clock, register, etc.). For example, according to one mode, each of multiple processes attempting to commit results of a transaction to globally accessible shared data space can attempt to modify the globally accessible variable. Because the different processes operate asynchronously with respect to each other, there can be contention amongst multiple processes trying to update the globally accessible variable at the same time. One possible way to update the globally accessible variable is for a respective process to implement use of a CAS (Compare And Swap) instruction. Use of such instruction and possible repeated looping of the instruction to update the globally accessible variable places an unnecessary burden on the parallel processing system. For example, looping can incur a significant amount of wasted processing time.

In lieu of looping, embodiments herein include implementing an instruction (e.g., a single CAS instruction) to attempt changing the globally accessible variable. According to such an implementation, a corresponding transaction stores a current value of the globally accessible variable (for updating the version information associated with the globally accessible shared data) regardless of whether an associated attempt by the corresponding transaction to modify the globally accessible variable was successful. Thus, a given process does not repeatedly apply a same CAS instruction until the globally accessible variable is updated to a new value. Instead, the respective process utilizes a retrieved value of the globally accessible variable whether it was modified or not by the process applying the CAS instruction. Failure to update the globally accessible variable does not result in data corruption because the given process applying the CAS instruction has corresponding locks on each of the segments to be modified in the commit phase as will be further discussed later in this specification.

Other embodiments include elimination of incrementing the globally accessible variable during a respective commit phase when a processing thread updates the globally accessible shared data with changes that occur during execution of the transaction. This reduces (coherency traffic and) possible contention with respect to updating the globally accessible variable because each of the processes, when in such a mode, do not update the globally accessible variable in order to commit results to the globally accessible shared data space. Instead, the processes only increment or modify the globally accessible variable if the given process aborts an attempt to commit results of a respective transaction to the globally accessible shared data.

In yet further embodiments, the parallel processing system can initiate switching between the above-mentioned mode of using a current value of the globally accessible variable regardless of whether an attempted modification fails and the above-mentioned mode of updating the globally accessible variable upon abortion of a corresponding transaction.

Note that techniques herein are well suited for use in applications such as those supporting parallel processing and use of shared data based on one or more processes. However, it should be noted that configurations herein are not limited to such use and thus configurations herein and deviations thereof are well suited for use in other environments as well.

In addition to the embodiments discussed above, other embodiments herein include a computerized device (e.g., a host computer, workstation, etc.) configured to support the techniques disclosed herein such as use of a globally accessible version information variable supporting parallel execution of transaction performed by different processes. In such embodiments, a computer environment includes a memory system, a processor (e.g., a processing device), a respective display, and an interconnect connecting the processor and the memory system. The interconnect can also support communications with the respective display (e.g., display screen or display medium). The memory system can be encoded with an application that, when executed on a respective processor, supports parallel processing according to techniques herein.

Yet other embodiments of the present disclosure include software programs encoded on computer-readable storage mediums to perform the method embodiment and operations summarized above and disclosed in detail below in the Detailed Description section of this disclosure. More specifically, one embodiment herein includes a computer program product (e.g., a computer-readable storage medium). The computer program product includes computer program logic (e.g., software instructions) encoded thereon. Such computer instructions can be executed on a computerized device to support parallel processing according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer-readable storage medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product or computer environment that includes a computer readable storage medium having instructions stored thereon to facilitate use of shared information among multiple processes. Based on use of the instructions and/or hardware associated with the computer environment, the computer environment enables each of multiple concurrently executing processes to: i) access globally accessible shared data to execute a corresponding transaction of multiple transactions being executed in parallel with each other; ii) access a globally accessible version information variable utilized by each of multiple processes executing the multiple transactions to update version information associated with the globally accessible shared data; and iii) for the corresponding transaction, store a current value of the globally accessible version information variable for updating the version information associated with the globally accessible shared data regardless of whether an associated attempt by the corresponding transaction to modify the globally accessible version information variable was successful.

In other embodiments herein, based on use of the instructions and/or hardware associated with the computer environment, the computer environment enables each of multiple concurrently executing processes to: i) access globally accessible shared data to execute a corresponding transaction of multiple transactions being executed in parallel with each other; ii) access a globally accessible version information variable utilized by each of multiple processes executing the multiple transactions to update version information associated with the globally accessible shared data; and iii) for the corresponding transaction, store a current value of the globally accessible version information variable for updating the version information associated with the globally accessible shared data.

Other embodiments of the present disclosure include hardware or hardware and software to perform any of the method embodiment steps and operations summarized above and disclosed in detail below.

It is to be understood that the system of the invention can be embodied as software and hardware or as hardware alone. Example embodiments of the invention may be implemented within computer systems, processors, and/or computer program products manufactured by Sun Microsystems Inc. of Palo Alto, Calif., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to embodiments herein, one aspect of the present disclosure describes a unique way for each of multiple processes to operate in parallel and use the same shared data without causing corruption to the shared data. For example, each of multiple processes utilizes current and past data values associated with a global counter or clock for purposes of determining whether any shared variables used to produce a respective transaction outcome were modified (by another process) during a respective transaction.

A respective transaction can implement one of multiple modes to complete a transaction such as storing a current value of the global counter for updating the version information. For example, in one mode, at completion of a transaction, the transaction can attempt to update a globally accessible version information variable and, regardless of whether an associated attempt by the corresponding transaction to modify the globally accessible version information variable is successful, continue to initiate completion of a respective transaction. As an alternative mode, a corresponding transaction can store a current value of the global variable (e.g., counter) for updating the version information associated with the globally accessible shared data without attempting to modify the globally accessible version information variable during the commit phase. In one embodiment, a parallel processing environment implements a combination of both aforementioned transaction completion modes depending on a self-abort rate.

Figure 1:
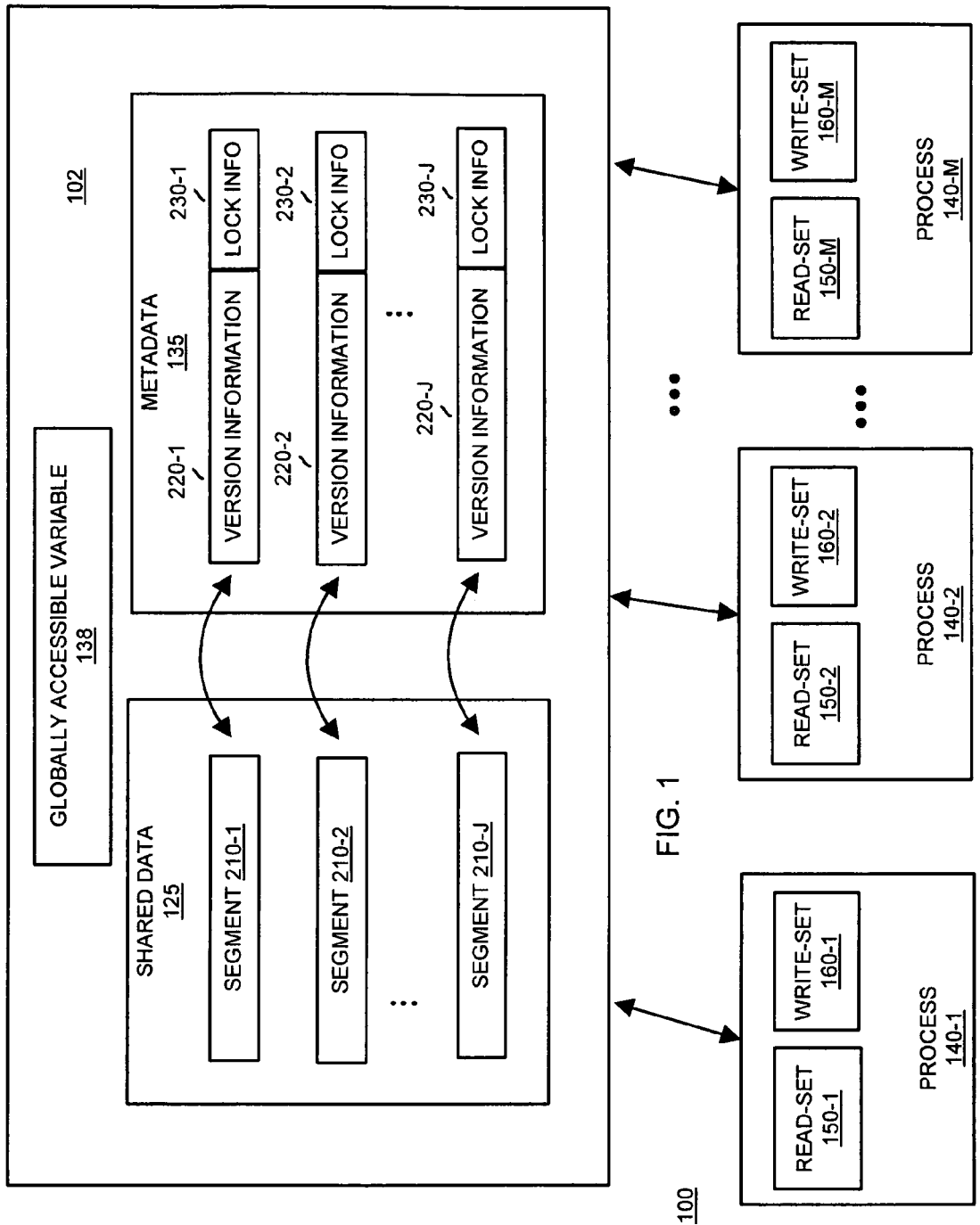
FIG. 1 is a diagram illustrating a computer environment enabling multiple processes to access shared data according to embodiments herein.

FIG. 1 is a block diagram of a computer environment 100 according to an embodiment herein. As shown, computer environment 100 includes shared data 125 and corresponding metadata 135 in global space 102 (e.g., a respective repository or global work environment) that is globally accessible by multiple processes 140 such as process 140-1, process 140-2, . . . process 140-M.

Metadata 135 enables each of processes 140 to identify whether portions (e.g., segments 210) of shared data 125 have been "locked" and whether any portions of shared data 125 have changed during execution of a respective transaction. Segments can be bits, bytes, a single data value, multiple data values, etc.

Each of processes 140 includes a respective read-set 150 and write-set 160 for storing information associated with shared data 125. The respective read-set and write-set are used to carry local computations with respect to a transaction. For example, process 140-1 includes read-set 150-1 and write-set 160-1 to carry out a respective one or more transactions associated with process 140-1. Process 140-2 includes read-set 150-2 and write-set 160-2 to carry out a respective transaction associated with process 140-2. Process 140-M includes read-set 150-M and write-set 160-M to carry out one or more transactions associated with process 140-M. Transactions and corresponding operations can be defined by one or more instructions of software code.

Each of processes 140 can execute a respective set of instructions to carry out a respective transaction. In one embodiment, the transactions executed by the processes 140 are derived from the same overall program or application running on one or more computers.

In the context of a general embodiment herein such as computer environment 100 in which multiple processes 140 execute transactions in parallel, each of processes 140 accesses shared data 125 to generate computational results (e.g., transaction results) that are locally performed and eventually committed for storage in a respective repository storing shared data 125. Shared data 125 is considered to be globally accessible because each of the multiple processes 140 can access the shared data 125.

Each of processes 140 can store data values locally that are not accessible by the other processes 140. For example, process 140-1 can globally access a data value and store a copy locally in write-set 160-1 that is not accessible by any of the other processes. In other words, one embodiment herein includes multiple processes 140, each of which includes its own privately accessible read-set 150 and write-set 160 for use as a local scratchpad prior to a committal phase.

During execution of a respective transaction, the process 140-1 is able to locally modify the data value in its write-set 160. Accordingly, one purpose of write-set 160 is to store globally accessed data that is modified locally.

As will be discussed later in this specification, the results of executing the respective transaction can be globally committed back to a respective repository (e.g., global space 102) storing shared data 125 depending on whether globally accessed data values, on which a respective transaction depends, happened to change during the course of the transaction executed by process 140-1. In general, a respective read-set 150-1 associated with each process stores information for determining which shared data 125 has been accessed during a respective transaction and whether any respective data values associated with globally accessed shared data 125 happens to change during execution of a respective transaction.

In one embodiment, write-set 160 is implemented as a speculative store buffer and holds all transactionally executed stores associated with the current transaction. Typically, a write-set entry contains at least an address and data value pair. Contingent upon an outcome of a respective transaction, the write-set entries will either be copied back to their ultimate locations or, if the transaction aborts, the write-set will simply be discarded.

As shown, global space 102 includes shared data 125, metadata 135, and globally accessible (version information) variable 138 (e.g., a multi-bit counter, register, clock, etc.) according to embodiments herein. Shared data 125 can be partitioned to include segment 210-1, segment 210-2, ..., segment 210-J. A respective segment of shared data 125 can be a resource such as a single variable, a set of variables, an object, a stripe, a portion of memory, etc.

Metadata 135 includes respective version information 220 and lock information 230 associated with each corresponding segment 210 of shared data 125. In one embodiment, version information 220 is a multi-bit value that is updated to be a current value of the globally accessible version information variable 138 each time a respective process 140 modifies contents of a corresponding segment 210 of shared data 135. Thus, version information 220 provides a relative time when a corresponding segment or data therein has been modified based on the globally accessible version information variable 138.

The lock information 230 and version information 220 associated with a respective segment 210 can be up to a single 64-bit or larger word. In one embodiment, the lock information 230 is a single bit indicating whether or not a respective segment is locked by another process. The version information 220 is a 63-bit value that is updated to be a data value of the globally accessible version information variable 138 at the time of modification. Both the version information and lock information for a respective segment can be modified using a single store operation.

In one embodiment, the processes 140 are responsible for updating version information and lock information. In other embodiments, each of processes 140 need not be responsible for updating the version information 220. For example, a monitor function separate or integrated with processes 140 automatically initiate changing version information 220 each time contents of a respective segment is modified.

As an example of utilizing shared data 125 and metadata 135, assume that process 140-2 attempts to modify contents of segment 210-1 during a commit phase of a respective executed transaction. Prior to committing transaction results globally to shared data 125, process 140-2 (e.g., during execution of the transaction) would read and store version information 220-1 associated with segment 210-1 as contents of segment 210-1 were accessed by the transaction. After completion of a transaction and during the commit phase when transaction results are committed for storage in the global space 102, the process 140-2 modifies respective version information 220 in metadata 135 to a new value for each segment 210 modified during the commit phase. In one embodiment, if process 140-2 modifies contents of segment 210-1, then process 140-2 updates the version information 220-1 to a current value of the globally accessible version information variable 138 at or around "commit" time.

As a specific example, prior to modifying segment 210-1, the version information 220-1 may have been a specific value such as 1306. After modifying segment 210-1, the process 140-2 updates the version information 220-1 to be a current value of globally accessible version information variable 138 such as a value of 1337 assuming that 1337 is the globally accessible version information variable 138 at a time of writing. In one embodiment, note that each time a respective process 140 updates any segment in shared data 125 with new data, the respective process increments a value of the globally accessible version information variable 138 by one. Alternatively, the globally accessible variable 138 can be updated in response to a self-abort when a respective process is unable to commit its results for storage in global space 102. Each of the processes 140 performs a similar updating of corresponding version information 220 each time a respective process 140 modifies a respective segment 210 of shared data 125. Accordingly, the processes can monitor the version information 220 to identify when changes have been made to a respective segment 210 of shared data 125.

Note that metadata 135 can maintain lock information 230 associated with each respective segment 210 of shared data 125. In one embodiment, the lock information 230 associated with each segment 210 is a globally accessible single bit indicating whether one of processes 140 currently has "locked" a corresponding segment for purposes of modifying its contents. For example, a respective process such as process 140-1 can set the lock information 230-J to a logic one indicating that segment 210-J has been locked for use. Other processes know that contents of segment 210-J should not be accessed, used, modified, etc. during the lock phase initiated by process 140-1. Upon completing a respective modification to contents of segment 210-J, process 140-1 sets the lock information 230-J to a logic zero indicating the segment 210-J is free again. All processes 140 can then compete again to obtain a lock with respect to segment 210-J.

Figure 2:
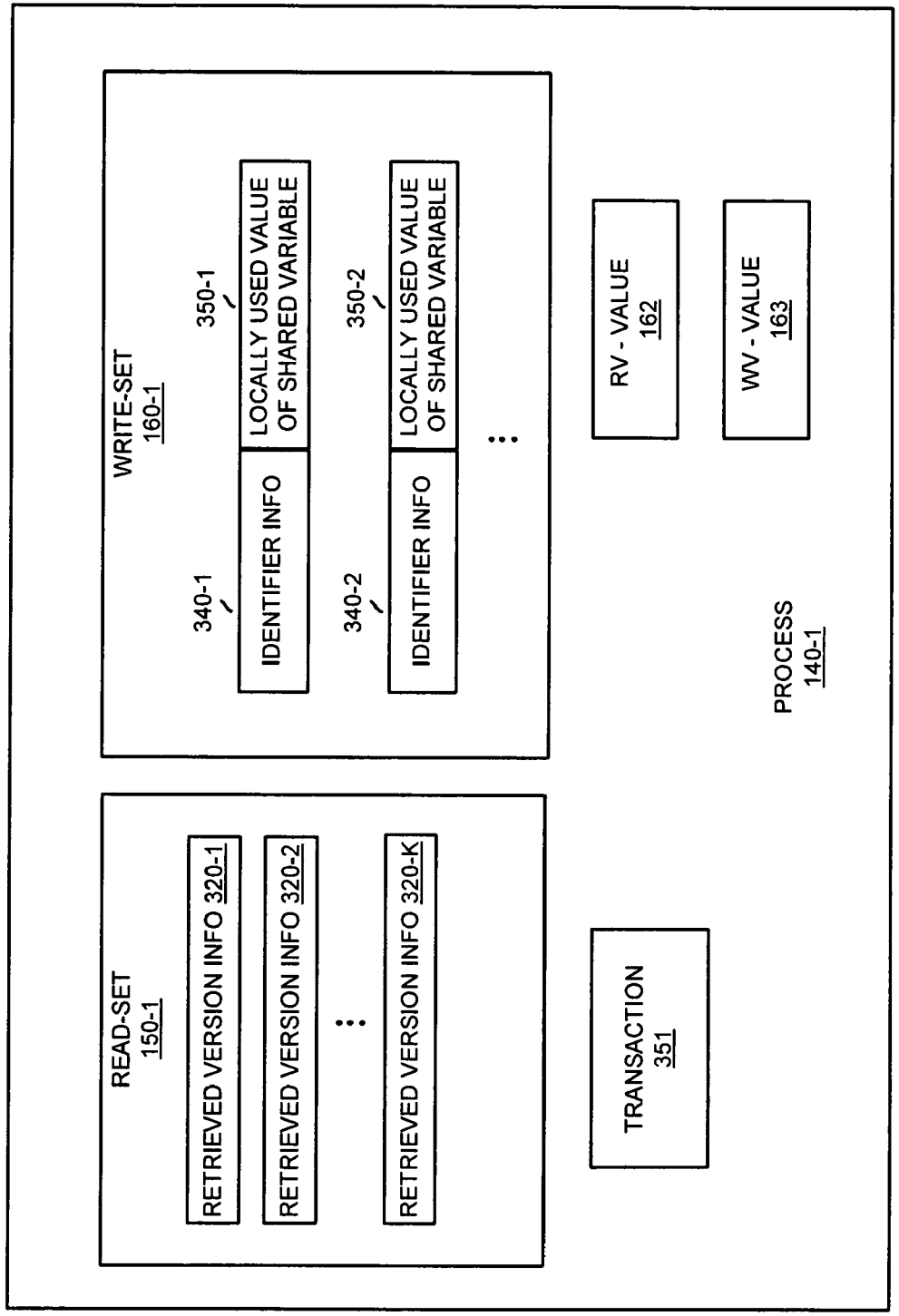
FIG. 2 is a diagram of a sample process including a read-set and write-set associated with a respective one of multiple processes according to embodiments herein.

FIG. 2 is a diagram more particularly illustrating details of respective read-sets 150 and write-sets 160 associated with processes 140 according to embodiments herein. As shown, process 140-1 executes transaction 351 (e.g., a set of software instructions) or multiple transactions. Read-set 150-1 stores retrieved version information 320-1, retrieved version information 320-2, ..., retrieved version information 320-K associated with corresponding data values (or segments 210) accessed from shared data 125 during execution of transaction 351. Accordingly, the process 140-1 can keep track of version information associated with any globally accessed data.

Write-set 160-1 stores shared variable identifier information 340 (e.g., address information, variable identifier information, etc.) for each respective globally shared variable that is locally modified during execution of the transaction 351.

Local modification involves maintaining and modifying locally used values of shared variables in write-set 160-1 rather than actually modifying the global variables during execution of transaction 351. As discussed above and as will be further discussed, the process 140-1 attempts to globally commit information in its write-set 160-1 to shared data 125 upon completion of transaction 351. In the context of the present example, process 140-1 maintains write-set 160-1 to include i) shared variable identifier information 340-1 (e.g., segment or variable identifier information) of a respective variable accessed from shared data 125 and corresponding locally used value of shared variable 350-1, ii) shared variable identifier information 340-2 (e.g., segment or variable identifier information) of a variable or segment accessed from shared data 125 and corresponding locally used value of shared variable 350-2, an so on. Accordingly, process 140-1 uses write-set 160-1 as a scratch-pad to carry out execution of transaction 351 and keep track of locally modified variables and corresponding identifier information.

In addition to a read-set 150 and write-set 160, each of multiple processes 140 maintains a respective RV-value 162 and WV-value 163. A respective process 140 sets its RV-value 162 equal to a data value of globally accessible version information variable 138 as read at the outset of a respective transaction 351. A respective process 140 sets WV-value 163 equal to a data value of globally accessible version information variable 138 as read during a commit phase of a respective transaction 351. More particular use of RV-value 162 and WV-value 163 will be discussed in the following figures.

Figure 3:
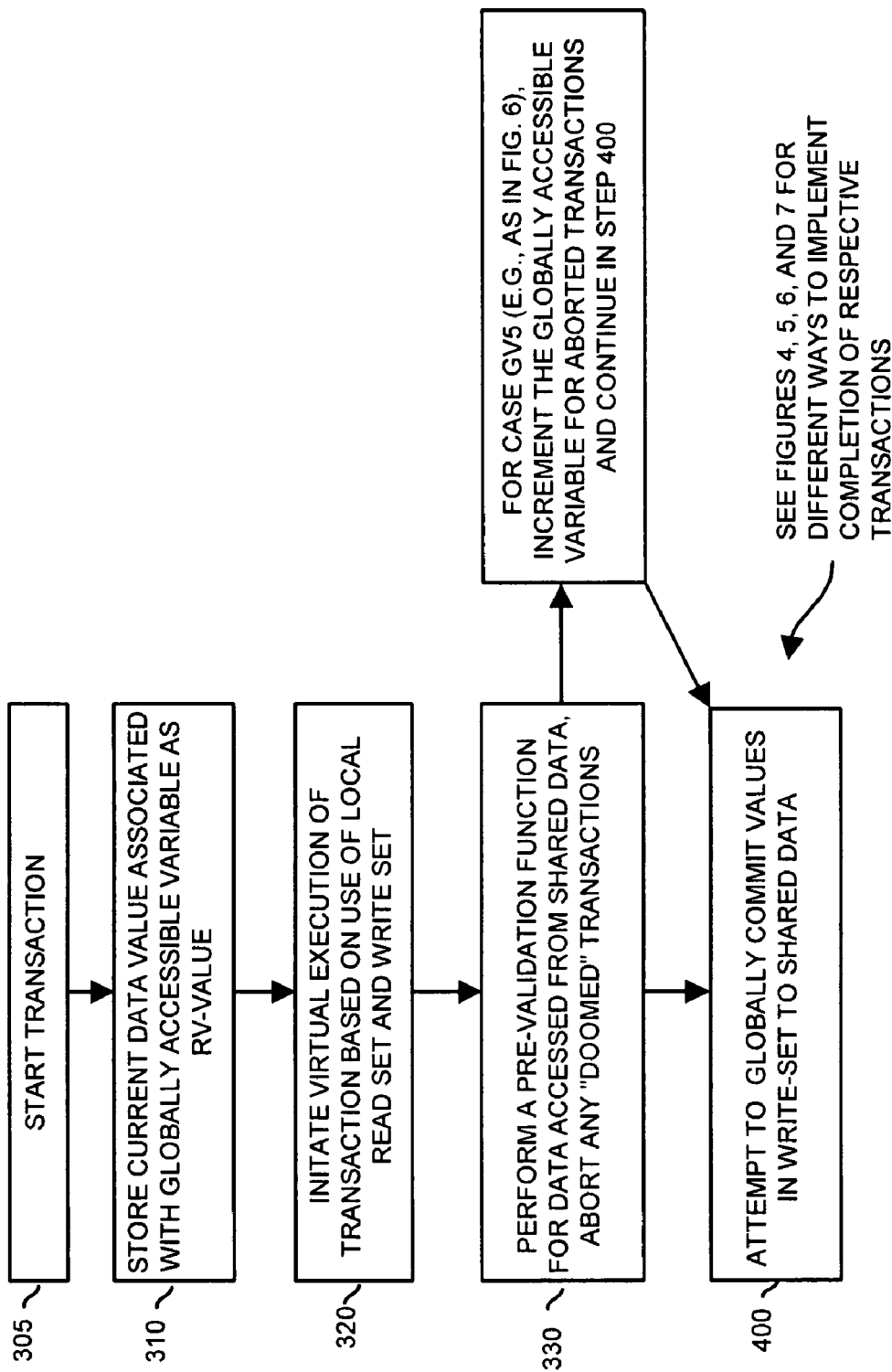
FIG. 3 is a diagram of a flowchart illustrating execution of a transaction according to an embodiment herein.

FIG. 3 is a flowchart 300 illustrating a more specific use of read-sets 150, write-sets 160, version information 220, and lock information 230, globally accessible version information variable 138, RV-value 162, and WV-value 163 according to embodiments herein.

Step 305 indicates a start of a respective transaction performed by a process 140. As previously discussed, a transaction 351 can involve execution of a set of software instructions indicating how to carry out one or more computations at least partially using shared data 125.

In step 310, a respective process 140 stores a current data value associated with globally accessible version information variable 138 and stores it as RV-value 162. In other words, the respective process samples a global version number of globally accessible version information variable 138 and loads the current value of the globally accessible version information variable 138 (e.g., global version number) in a local variable called the RV-value 162. RV-value 162 is used at a later time for detection of recent changes to shared data 125 based on comparing the RV-value to version information 220.

In step 320, the respective process initiates virtual execution of the transaction based on use of its read-set 150 and write-set 160. For example, the respective process executes the transaction code associated with a respective transaction 351. In one embodiment, load and store instructions in the transaction 351 are modified (e.g., augmented and replaced) so that a transaction's operations are performed locally in read-set 150 and write-set 160 without modifying shared data 125 until a commit phase performed at a later time. This "local" logging functionality can be implemented by simply augmenting load instructions with corresponding instructions that record read accesses and replaces stores with code recording the address and value to be written.

In one embodiment, during a load transaction (e.g., read from shared data 125), a respective process checks whether the corresponding load address associated with the load transaction already appears in its respective write-set 160. If so, the transactional load returns the last value (as stored in the write-set 160) written to the address in the write-set 160 rather than fetching the data value of the variable from shared data 125. If not, the process retrieves the variable from shared data 125. This technique avoids so-called read-after-write hazards.

In step 330, the process executing the respective transaction performs a pre-validation function for data accessed from shared data and aborts the transaction if it is "doomed". Global access of data from the shared data 125 can involve execution of a set of pre-validation code that checks version information 220 and lock information 230. For example, a process can check whether a version value associated with an accessed portion of a respective segment has not changed and that the segment is free from locks. Also, the process can verify whether the version information associated with the segment being accessed has a respective value less than or equal to RV-value 162. If the respective value is greater than RV-value 162, this indicates that the respective memory location in shared data 125 associated with the variables being accessed may have been modified since starting the respective transaction. In such circumstances, the process can abort the transaction. This prevents so-called "doomed" transactions from needlessly executing because it is known up front that "relied upon" shared data 125 associated with a respective transaction has been modified by another process. Otherwise, processing continues in step 400.

Figure 6:
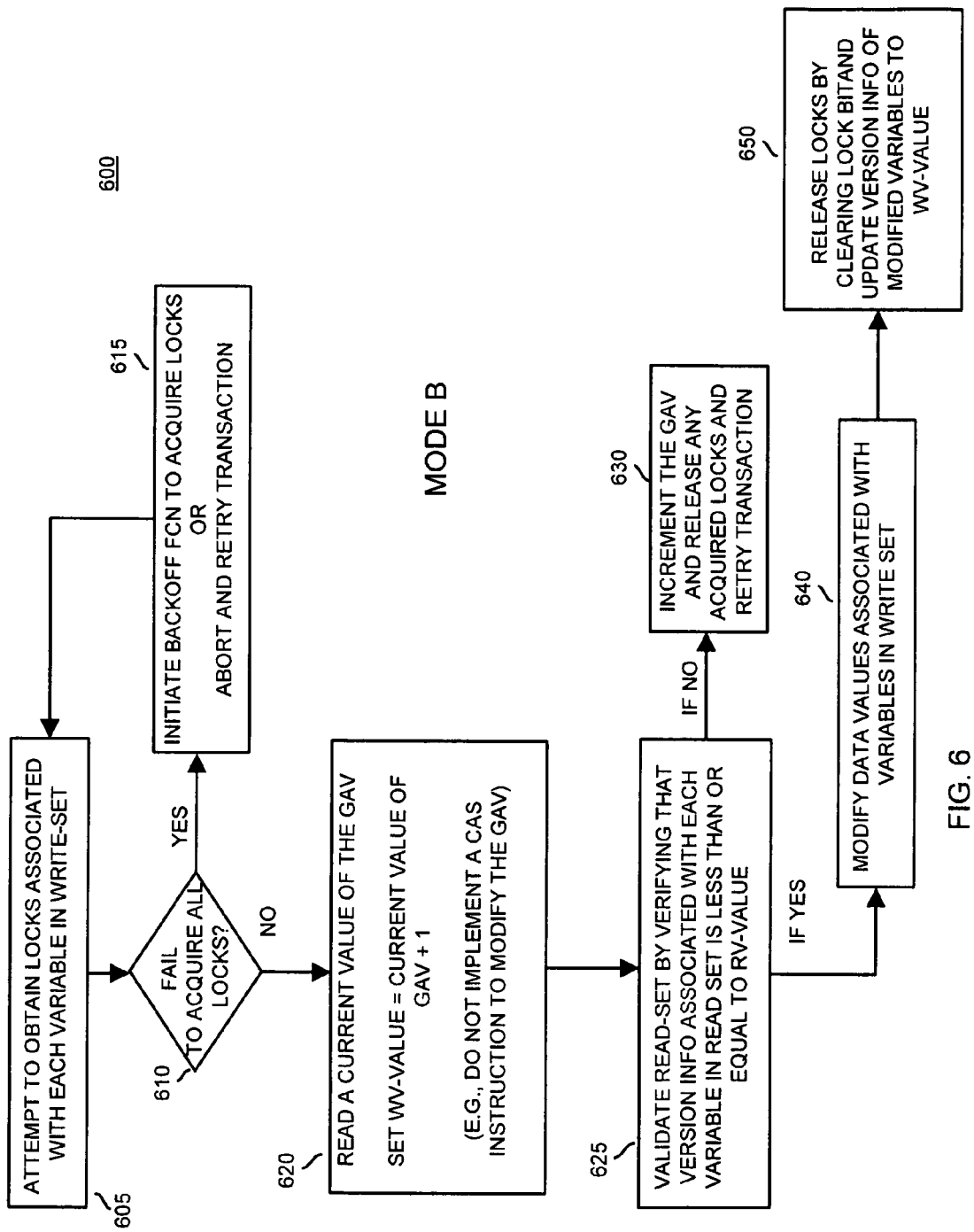
FIG. 6 is a diagram of a flowchart illustrating a technique for completing execution of a transaction using mode B according to embodiments herein.

Note that in the case of implementing the GV5 configuration as further discussed with respect to FIG. 6, step 330 can optionally include an additional step 331 of incrementing the globally accessible variable 138 if the transaction is aborted and continuing with step 400.

Different possible implementations of step 400 are further discussed with respect to following FIGS. 4, 5, 6, and 7 and corresponding text. In general, in step 400, the respective process completes a respective transaction by attempting to globally commit values in its write-set 160 to shared data 125.

Figure 4:
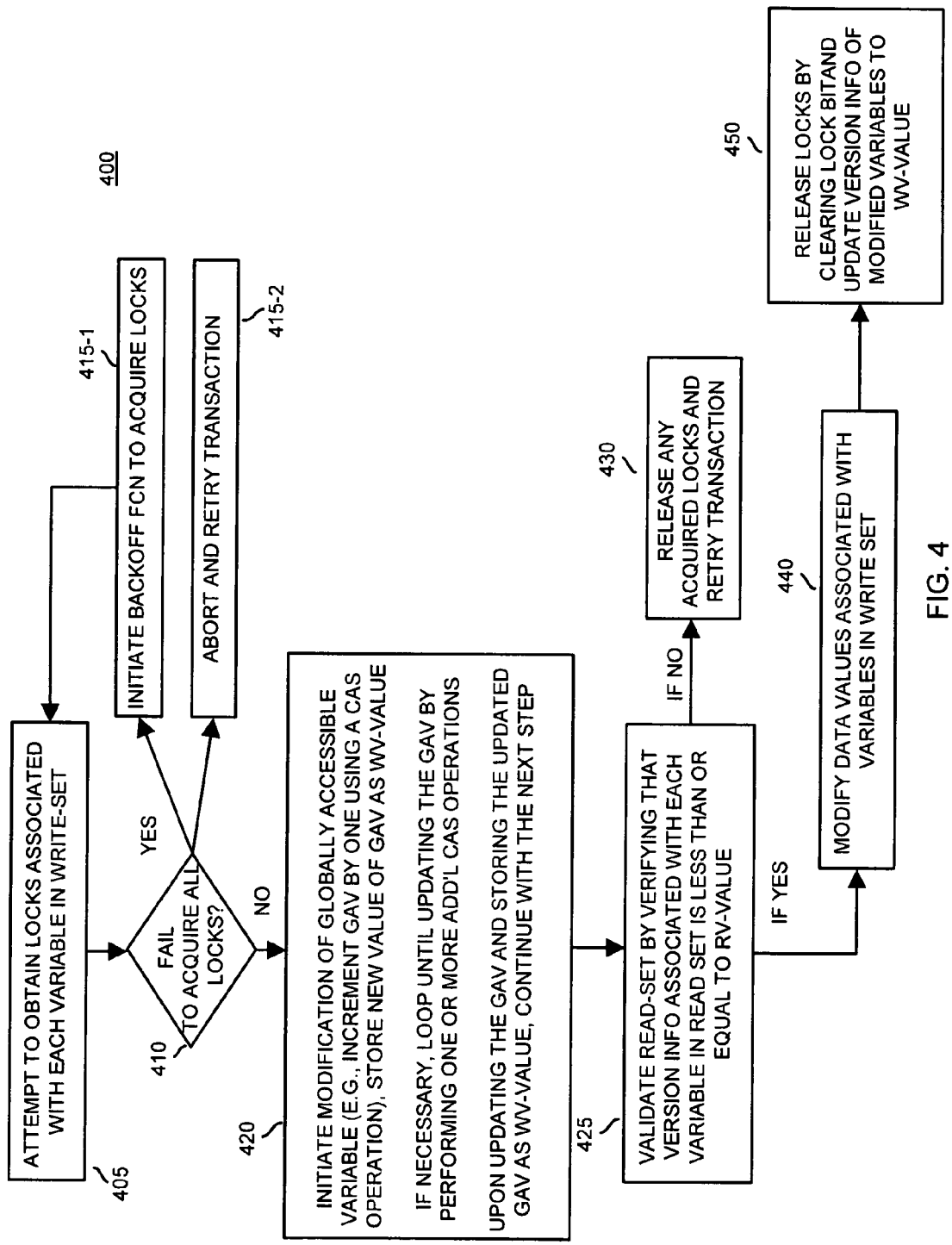
FIG. 4 is a diagram of a flowchart illustrating a technique for completing execution of a transaction according to embodiments herein.

FIG. 4 is a flowchart 400 illustrating a technique for committing results of a transaction to shared data 125 according to embodiments herein. Up until this point, the process of executing the respective transaction has not initiated any locks on any shared data, although the process may initiate execution of local computations associated with shared data 125 accessed from global space 102.

In step 405, the respective process that executed the current transaction attempts to obtain locks associated with each variable in its write-set 160. For example, the process checks whether lock information in metadata 135 indicates whether the variables (e.g., corresponding segments 210) to be written to (e.g., specific portions of globally accessible shared data 125) are locked by any other processes. The process initiates locking the variables (or segments as the case may be) to block other processes from using or locking the variables as previously discussed. In one embodiment, the respective process acquires the locks in any convenient order using bounded spinning to avoid indefinite dead-locks.

In case not all of these locks are successfully acquired in step 410, the transaction can initiate a back-off function to acquire locks as indicated in step 415-1. Alternatively, the process can abort and retry a transaction as indicated in step 415-2.

After all appropriate locks have been obtained in step 405 by writing respective lock information 230 for all variables that will be modified, processing continues at step 420. In step 420, the respective process initiates modification of globally accessible version information variable 138. For example, in one embodiment, the process implements a CAS function to increment the globally accessible variable 138 by one (or some other designated amount) and stores a copy of the data value associated with the new globally accessible version information variable 138 as WV-value 163. If the increment function happens to fail due to contention by other processes attempting to update the globally accessible variable 138, the process can repeatedly implement a CAS instruction until updating the globally accessible variable 138 is successful.

Upon successful modification of the globally accessible variable 138, the process records a current returned value of the globally accessible variable 138 and stores it as WV-value 163.

In step 425, the process validates its respective read-set 150 by verifying that version information associated with each variable identified in the read-set 150 is less than or equal to RV-value 162. The process also verifies that memory locations in shared data 125 associated with the accessed variables have not been locked by other threads. If this verification fails, then the respective transaction is aborted as indicated in step 430.

By re-validating the read-set 150 at the commit phase, the process can be assured that respective memory locations in shared data 125 have not been modified during execution of the respective transaction. In the special case where RV-value+1=WV-value, then it is not necessary to validate the respective read set 150 because it is guaranteed that no concurrently executing transaction modified such locations of shared data 125.

In step 440, the respective process executing a transaction modifies data values associated with the variables in its write-set 160. This involves storing data values associated with locally modified variables to shared data 125. Accordingly, other processes 140 can use the results associated with the committed transaction.

In step 450, the process releases locks by clearing lock bits and updates version information of any modified variables to equal WV-value 163. This can be done using a simple store instruction. For example, for each location in the write-set 160, the process can store a new data value to the appropriate location in shared data. Also, the process can simultaneously update respective version information associated with a modified segment as well as release a respective lock based on a single store instruction.

The above embodiment discussed with respect to FIG. 4 includes incrementing globally accessible variable 138 at commit-time for each transaction that updates shared variables. Such an operation can result in CAS contention. For example, in a SPARC™ environment, a CAS function includes fetching a value of the globally accessible variable 138, incrementing the retrieved value, and writing the value back to the globally accessible variable 138. As previously discussed, the commit phase can include repeatedly applying a CAS instruction (e.g., via a loop) until the globally accessible variable 138 is updated. When multiple processes implement such a function during a commit phase, this can result in considerable cache coherency traffic. According to the embodiment discussed in FIG. 4, each of the transactions fetch and attempt to modify the globally accessible variable 138. This mode of clock management is known as GV1.

Figure 7:
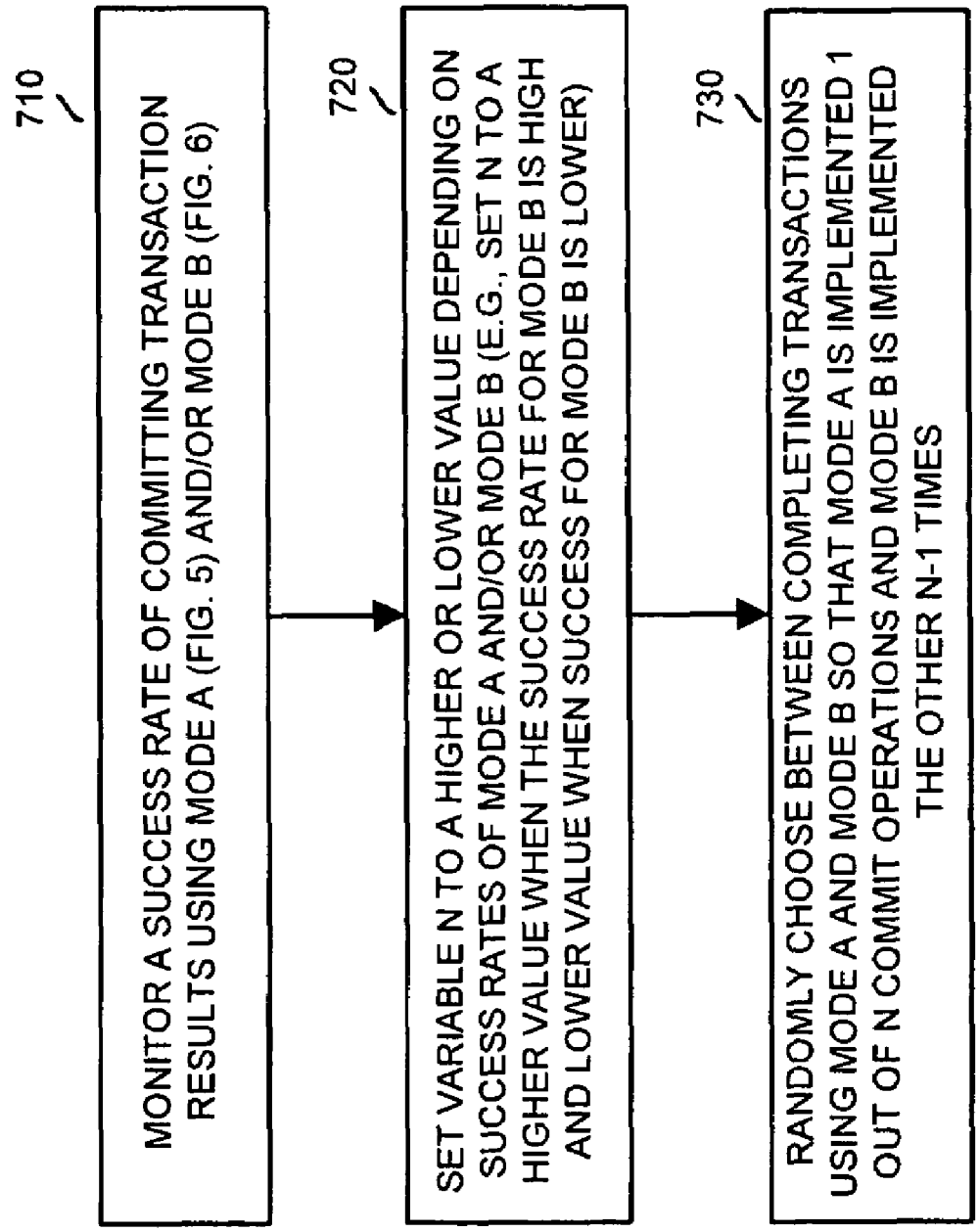
FIG. 7 is a diagram of a flowchart illustrating a technique for completing execution of a transaction based on selective switching between mode A and mode B according to embodiments herein.

Further embodiments herein include implementing refined clock management schemes such as GV4 (e.g., shown and discussed with respect to FIG. 5), GV5 (e.g., shown and discussed with respect to FIG. 6), and GV6 (e.g., shown and discussed with respect to FIG. 7). The source code according to embodiments herein can contain conditional compilation directives that allow the developer to switch between the various schemes at compile-time such as those described in the following figures.

At an outset of a respective transaction 351, as discussed above in FIG. 3, the corresponding process initially reads the globally accessible variable 138. This read value is (stored as RV-value 162 and is) subsequently used during the transaction to validate whether the corresponding read-set 150 (the observed data values) is consistent. All transactions that update portions of shared data 125 can be required (as discussed above with respect to FIG. 4) to increment the globally accessible variable 138 at commit-time. Repeated attempts by each of multiple processes to read and write to the globally accessible variable 138 can result in considerable SMP coherency traffic. In addition to coherency traffic, contention can occur with respect to the globally accessible variable 138 when two or more processes attempt to simultaneously update the globally accessible variable 138 via respective CAS operations. This can limit the scalability of using the globally accessible variable 138.

The following portion of the present disclosure describes three related mechanisms that address the problems described above. These mechanisms reduce coherency traffic and compare-and-swap contention, resulting in improved transactional throughput.

Figure 5:
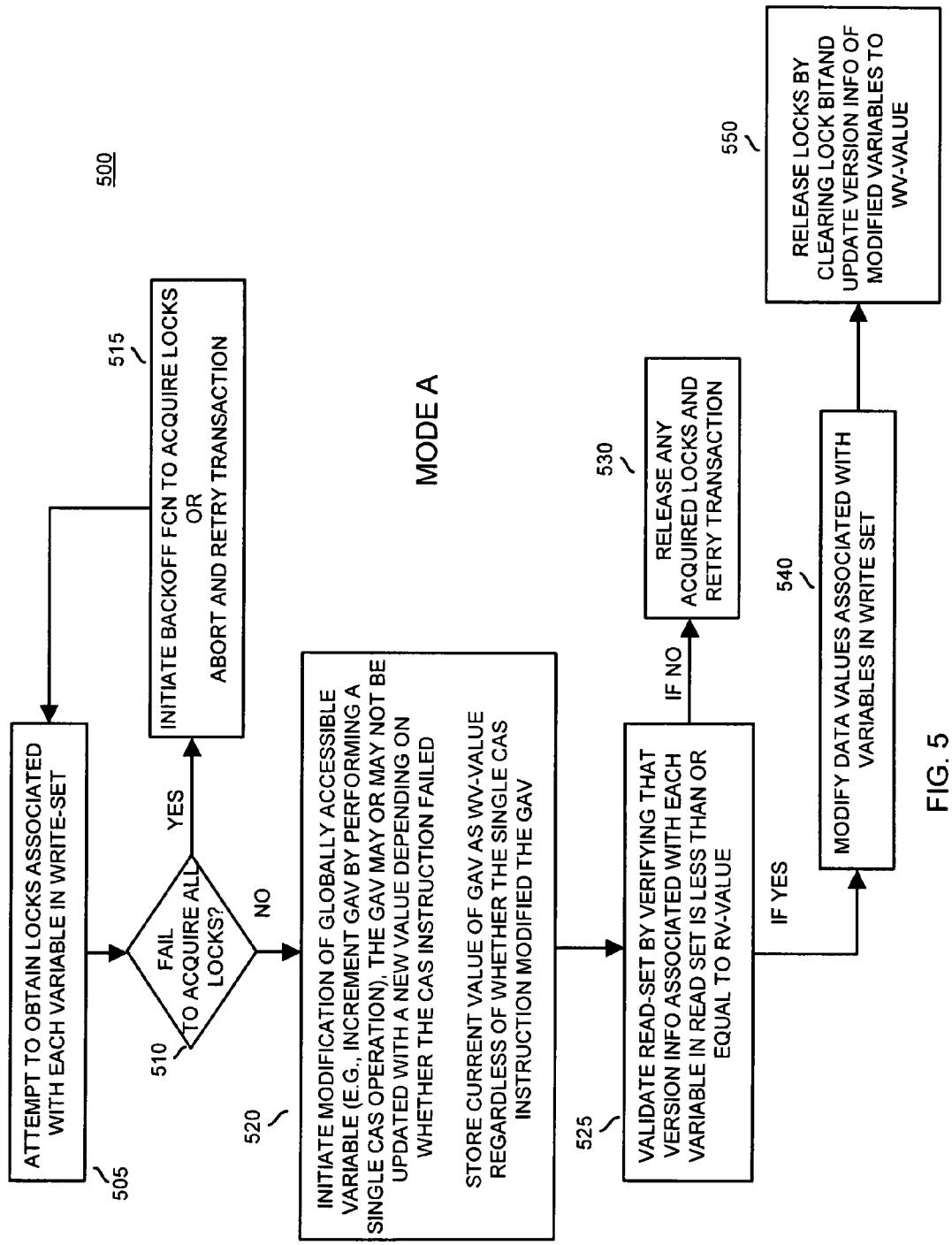
FIG. 5 is a diagram of a flowchart illustrating a technique for completing execution of a transaction using mode A according to embodiments herein.

As an example of one mode, FIG. 5 is a flowchart 500 illustrating mode A (e.g., GV4) for completing execution of a respective transaction described in FIG. 3 according to embodiments herein.

In such an embodiment, a respective process in step 505 attempts to obtain locks associated with each variable in its write-set 160. For example, the process checks whether lock information in metadata 135 indicates whether the variables (e.g., corresponding segments 210) to be written to (e.g., specific portions of globally accessible shared data 125) are locked by any other processes. The process initiates locking the variables (or segments as the case may be) to block other process from using or locking the variables as previously discussed. In one embodiment, the respective process acquires the locks in any convenient order using bounded spinning to avoid indefinite dead-locks.

In case not all of these locks are successfully acquired in step 510, the transaction can initiate a back-off function to acquire locks or alternatively abort and retry a transaction as indicated in step 515.

After all appropriate locks have been obtained in step 505 by writing respective lock information 230 for all data in global space 102 that will be modified, processing continues at step 520. In step 520, the respective process initiates modification of globally accessible variable 138. For example, in one embodiment, the process implements a single CAS or other function to increment or modify the globally accessible variable 138. The attempt to modify a current value of the globally accessible variable 138 may or may not fail as a result of contention by other processes. Regardless of whether an attempted modification fails, the given process stores a copy of the current value of globally accessible variable 138 (whether updated or not based on application of the modify instruction) and stores the result as WV-value 163.

In step 525, the process validates its respective read-set 150 by verifying that version information associated with each variable identified in the read-set 150 is less than or equal to RV-value 162. The process also verifies that memory locations in shared data 125 associated with the accessed variables have not been locked by other threads. If this verification fails, then the respective transaction is aborted as indicated in step 530.

By re-validating the read-set 150 at the mode A type commit phase in step 525 of flowchart 500, the process can be assured that variables that have been accessed by the transaction have not been modified during execution of the respective transaction.

In step 540, the respective process executing a transaction modifies data values associated with the variables in its write-set 160. This involves storing data values associated with locally modified variables to shared data 125. Accordingly, other processes 140 can use the results associated with the committed transaction.

In step 550, the process releases locks by clearing lock bits 230 and updates respective version information 220 for any modified variables to equal WV-value 163. This can be done by using a simple store instruction to simultaneously update respective version information associated with a modified segment as well as release a respective lock based on a single store instruction.

Thus, in the original algorithm as discussed above with respect to FIG. 4, the transactional commit operation would (a) acquire locks covering the transaction's write-set, (b) atomically increment the global version number yielding a WV (Write Version) value, (c) validate the transaction's read-set, and, contingent upon (c), write-back the values from the write-set to their ultimate shared locations and then release and update the locks covering the write-set by storing WV into the lock-words. The increment of the global version number was accomplished with a loop using an atomic compare-and-swap (CAS) instruction.

Embodiments herein such as those discussed with respect to FIG. 5, however, safely replace the loop with a single CAS attempt. Suppose there are two nearly simultaneous transactions trying to atomically increment the global version number (e.g., globally accessible variable 138). Assume that a CAS instruction performed by a first thread succeeds but a CAS instruction performed by a second thread fails, returning the value of the globally accessible variable 138 just installed by the first thread. Both the first and second thread can safely use a current value of the globally accessible variable 138 as their respective WV-value. The thread whose CAS fails "borrows" the newly incremented value returned by the failing CAS instruction and uses that value as its WV. Note that this still may incur CAS latency on every attempt to increment the global clock and we still generate cache-coherent read-write traffic on the clock but we have avoided CAS contention and the retries inherent in looping as discussed above with respect to FIG. 4.

Allowing the first and second thread to use the same WV is safe. If the CAS used to atomically increment the global version number fails then we have 2 writers racing; one atomic increment attempt succeeded and one failed. Because the first and second threads hold locks on their respective write-sets at the time they try to increment, we know that their write-sets do not intersect. Furthermore, if the write-set of one thread intersects the read-set of the other then we know that one transaction will subsequently fail validation (either because the lock associated with the read-set entry is held by the other thread, or because the other thread already committed and released the lock covering the variable, installing the new WV). As such, both the first and second thread in the above example can safely use the same (duplicate) WV-value.

This relaxation provides a significant performance benefit on high-order SMP systems. The above notion can be extended to more than 2 threads. The safety invariant is that any computed WV-value should be greater than any previously read (observed) RV-value.

As an example of another mode, FIG. 6 is a flowchart 600 illustrating mode B (e.g., GV5) for completing execution of a respective transaction described in FIG. 3 according to embodiments herein.

In such an embodiment, a respective process in step 605 attempts to obtain locks associated with each variable in its write-set 160. For example, the process checks whether lock information in metadata 135 indicates whether the variables (e.g., corresponding segments 210) to be written to (e.g., specific portions of globally accessible shared data 125) are locked by any other processes. The process initiates locking the variables (or segments as the case may be) to block other process from using or locking the variables as previously discussed. In one embodiment, the respective process acquires the locks in any convenient order using bounded spinning to avoid indefinite deadlocks.

In case not all of these locks are successfully acquired in step 610, the transaction can initiate a back-off function to acquire locks or alternatively abort and retry a transaction as indicated in step 615.

After all appropriate locks have been obtained in step 605 by writing respective lock information 230 for all data in global space 102 that will be modified, processing continues at step 620. In step 620, the respective process does not initiate modification of globally accessible variable 138 but instead merely reads a current value of globally accessible variable 138 and sets its WV-value equal to the current value of globally accessible variable 138 plus 1.

In step 625, the process validates its respective read-set 150 by verifying that version information associated with each variable identified in the read-set 150 is less than or equal to RV-value 162. For example, the process verifies that each accessed variable (e.g., location) as identified in the read-set 150 has a respective version number that is less than or equal to RV-value 162. The process also verifies that memory locations in shared data 125 associated with the accessed variables have not been locked by other threads. If this verification fails, then the respective transaction modifies the current value of globally accessible variable 138 and self-aborts as indicated in step 630.

By re-validating the read-set 150 at the mode B type commit phase in step 625 of flowchart 600, the process can be assured that respective memory locations in shared data 125 that have been accessed by the transaction have not been modified during execution of the respective transaction.

In step 640, the respective process executing a transaction modifies data values associated with the variables in its write-set 160. This involves storing data values associated with locally modified variables to shared data 125. Accordingly, other processes 140 can use the results associated with the committed transaction.

In step 650, the process releases locks by clearing lock bits 230 and updates respective version information 220 for any modified variables to equal WV-value 163. This can be done by using a simple store instruction to simultaneously update respective version information associated with a modified segment as well as release a respective lock.

Thus, FIG. 6 (e.g., mode B or GV5) illustrates an alternative way to complete a respective transaction with respect to the techniques as discussed above in FIGS. 4 and 5. For example, instead of attempting to increment the global version number, embodiments herein include simply setting computing WV-value 163 equal to the GlobalVersionNumber+1. Note that the terminal GlobalVersionNumber is equivalent to globally accessible variable 138 as described herein, thus they are used interchangeably. This greatly reduces coherency traffic (write-rate) on the GlobalVersion- Number at the cost of an increased false-positive abort rate. As discussed above with respect to FIG. 6, the globally accessible variable 138 is modified (e.g., incremented) at abort-time.

FIG. 7 is a flowchart 700 illustrating a technique of completing different transactions by selectively switching between mode A and mode B according to embodiments herein.

For example, in step 710, a process monitors a success rate of committing transaction results for each of mode A and mode B.

In step 720, the process sets a variable to a higher or lower value depending on success rates of mode A and mode B. In one embodiment, the process sets N to a higher value when the success rate for mode B is lower.

In step 730, the process chooses between completing a respective transaction using mode A and mode B so that mode A is implemented 1 out of N commit operations and mode B is implemented the other N−1 times.

The technique as described herein with respect to FIG. 7 (e.g., GV6) is an adaptive hybrid of the technique as discussed above with respect to FIG. 5 (e.g., GV4) and FIG. 6 (e.g., GV5). One embodiment herein includes employing a random number generator to select between GV4 and GV5. For 1 out of N commit operations, transactions are completed using GV4, the other N−1 times transaction are completed using GV5.

In one variation on GV6, embodiments herein include varying N based on the recent successful commit rate (transactional throughput). For example, embodiments herein can include programmatically varying N using feedback to try to maximize transactional throughput. Alternatively, one embodiment includes attempting to minimize an abort rate.

Both mode A (e.g., GV5) and mode B (e.g., GV6) admit single-threaded false positive aborts. Consider the following scenario:

1. Suppose that the globally accessible variable 138 is currently a value of 10.
2. Suppose that Thread T1 calls TxStart( ), which fetches a current value of the globally accessible variable 138, observes a value of 10, and sets its RV-value equal to 10.
3. Suppose T1 calls TXST( ).
4. At commit-time, T1 computes WV=12=GCLOCK+2.

Thread T1 does not atomically update globally accessible variable 138 to 12. The globally accessible variable 138 value remains 10. Note that embodiments herein can include adding 2 to a current value of globally accessible variable 138 so the least significant bit of globally accessible variable 138, WV, RV, etc., remain 0, keeping the layout of the globally accessible variable 138 value the same as the versioned write-lock words where the LSB is "locked" indicator. This can be done for convenience sake.

5. Suppose that T1 stores WV (12) in various versioned lock words covered by the write-set. The transaction commits successfully.
6. Suppose thread T1 then runs a esc transaction. TxStart( ) fetches_GCLOCK=10 and sets its RV-value accordingly. The thread calls TXLD( ) to fetch a variable written in the first transaction and observes Version#=12, which is >RV-value. The thread aborts.

This is an example of a false positive abort (or "self abort") as there is no actual interference with respect to other threads. We can recover from such a condition by atomically incrementing globally accessible variable 138 at abort-time if we find that RV-value=globally accessible variable 138 and that the observed stripe version number that caused the abort is >globally accessible variable 138. Alternatively, embodiments herein can include attempting to avoid occurrences of false positive aborts by advancing globally accessible variable 138 at the start of a respective transaction when computing an RV-value if a process finds that the thread's previous WV is >than the current GCLOCK value.

If the system provides a globally coherent readable clock, such as % STICK on SPARC, we can use that clock instead of the software-based GCLOCK variable. It's critical that clock accesses and memory references provide at least causal consistency. Critically, if thread T2 reads the clock and observes value V1, and stores V1 into memory, and T2 observes that store, then when T2 reads the clock it should observe a value>=V1.

Figure 8:
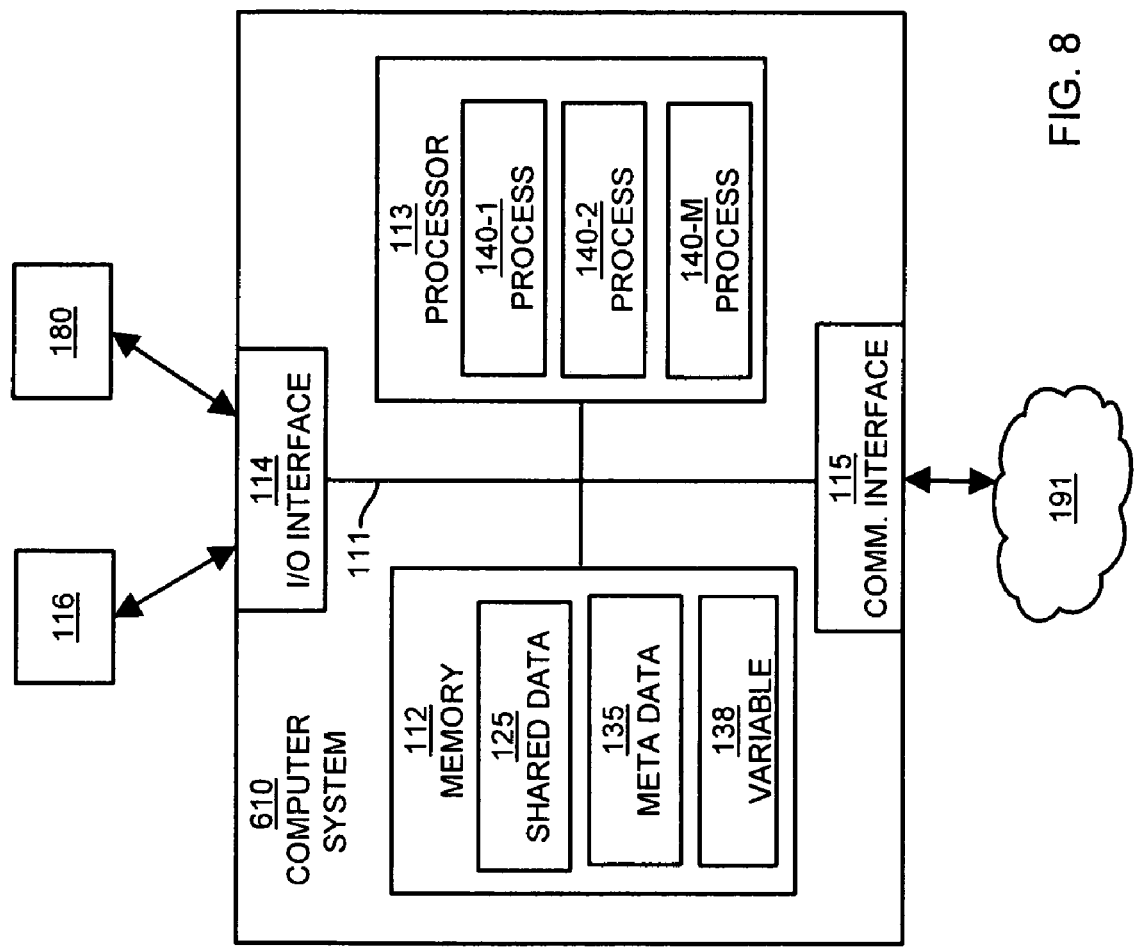
FIG. 8 is a diagram of a sample architecture supporting shared use of data according to embodiments herein.

FIG. 8 is a block diagram illustrating an example computer system 610 (e.g., an architecture associated with computer environment 100) for executing parallel processes 140 and other related processes according to embodiments herein. Computer system 610 can be a computerized device such as a personal computer, workstation, portable computing device, console, network terminal, processing device, etc.

As shown, computer system 610 of the present example includes an interconnect 111 that couples a memory system 112 storing shared data 125, globally accessible version information variable 138, and metadata 135, one or more processors 113 executing processes 140, an I/O interface 114, and a communications interface 115. Control system 610 can include peripheral devices 116 (e.g., one or more optional user controlled devices such as a keyboard, mouse, display screens, etc.) that couple to processor 113 through I/O interface 114. I/O interface 114 also enables computer system 610 to access repository 180 (that also potentially stores shared data 125 and/or metadata 135). Communications interface 115 enables computer system 610 to communicate over network 191 to transmit and receive information from different remote resources.

Note that functionality associated with processes 140 and/or computer environment 100 can be embodied as software code such as data and/or logic instructions (e.g., code stored in the memory or on another computer readable medium such as a disk) that support functionality according to different embodiments described herein. Alternatively, the functionality associated with processes 140 can be implemented via hardware or a combination of hardware and software code. Processor 113 can include one or multiple processors executing multiple threads.

It should be noted that, in addition to the processes 140 themselves, embodiments herein include a respective application and/or set of instructions to carry out processes 140. Such a set of instructions associated with processes 140 can be stored on a computer readable medium such as a floppy disk, hard disk, optical medium, etc. The set of instructions can also be stored in a memory type system such as in firmware, RAM (Random Access Memory), read only memory (ROM), etc. or, as in this example, as executable code.

Collective attributes associated with processes 140, global space 102, and computer environment 100, etc. will now be discussed with respect to flowcharts in FIGS. 9-11. For purposes of this discussion, global space 102 and/or computer environment 100 (or process therein) can execute or carry out the steps described in the respective flowcharts. Note that the steps in the below flowcharts need not always be executed in the order shown.

Figure 9:
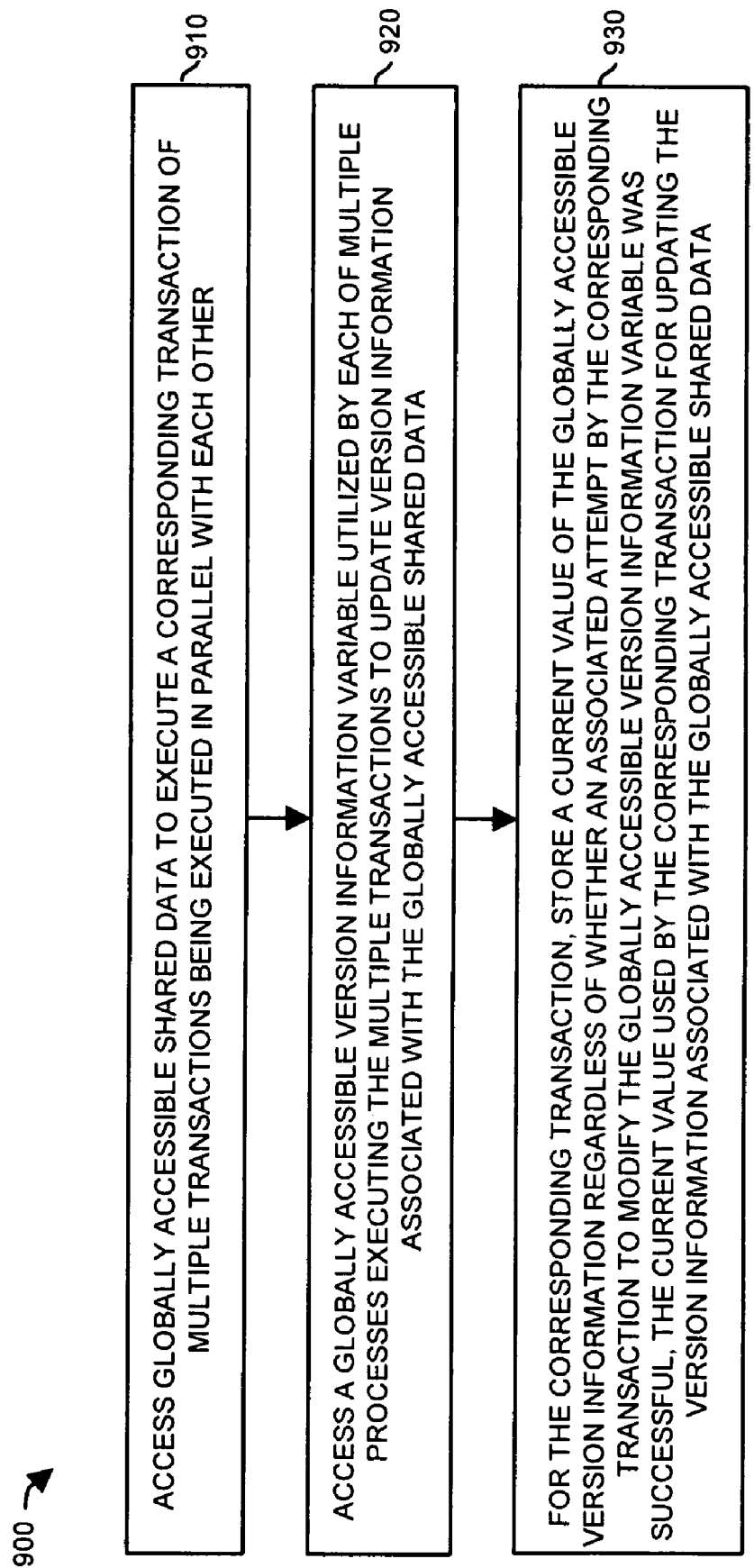
FIG. 9 is a diagram of a flowchart illustrating a technique supporting simultaneous execution of multiple processing threads according to an embodiment herein.

Now, more particularly, FIG. 9 is a flowchart 900 illustrating a technique supporting execution of parallel transactions in computer environment 100 according to an embodiment herein. Note that techniques discussed in flowchart 900 overlap and summarize some of the techniques discussed above.

In step 910, a given process 140 accesses globally accessible shared data 125 to execute a corresponding transaction of multiple transactions being executed in parallel with each other.

In step 920, the given process 140 accesses globally accessible variable 138 (e.g., a globally accessible version information variable) utilized by each of multiple processes executing the multiple transactions to maintain version information 220 associated with the globally accessible shared data 125.

In step 920, for the corresponding transaction executed by the given process, the given process 140 stores a current value of the globally accessible variable 138 for proceeding with a routine to commit results to shared data 125 regardless of whether an associated attempt by the corresponding transaction to modify the globally accessible variable 138 was successful. The current value of the globally accessible variable 138 is used by the corresponding transaction for maintaining the version information associated with the globally accessible shared data.

Figure 10:
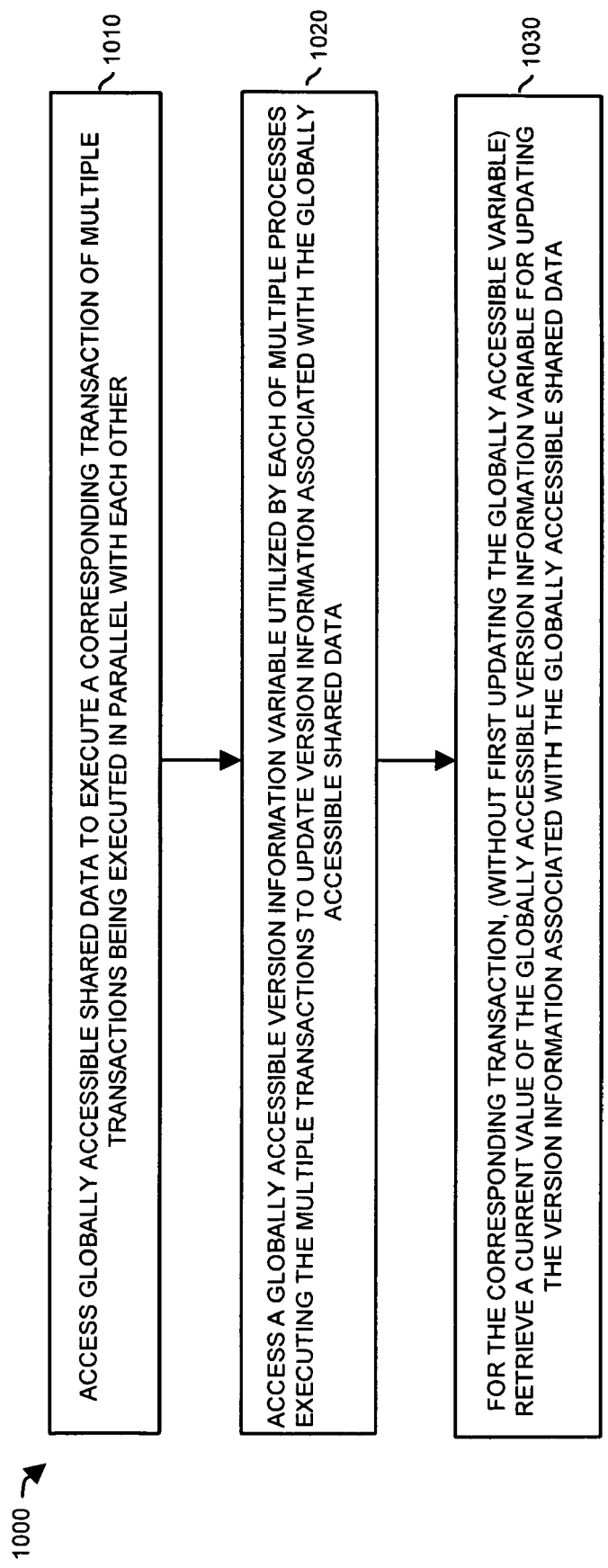
FIG. 10 is a diagram of a flowchart illustrating a technique supporting simultaneous execution of multiple processing threads according to an embodiment herein.

FIG. 10 is a flowchart 1000 illustrating a technique supporting execution of parallel transactions in computer environment 100 according to an embodiment herein. Note that techniques discussed in flowchart 1000 overlap and summarize some of the techniques discussed above.

In step 1010, a given process 140 accesses globally accessible shared data 125 to execute a corresponding transaction of multiple transactions being executed in parallel with each other.

In step 1020, the given process 140 accesses globally accessible variable 138 utilized by each of multiple processes executing the multiple transactions to maintain version information 220 associated with the globally accessible shared data.

In step 1030, for the corresponding transaction, (without first updating the globally accessible variable) the given process 140 retrieves a current value of the globally accessible variable 138 for maintaining the version information 220 associated with the globally accessible shared data.

Figure 11:
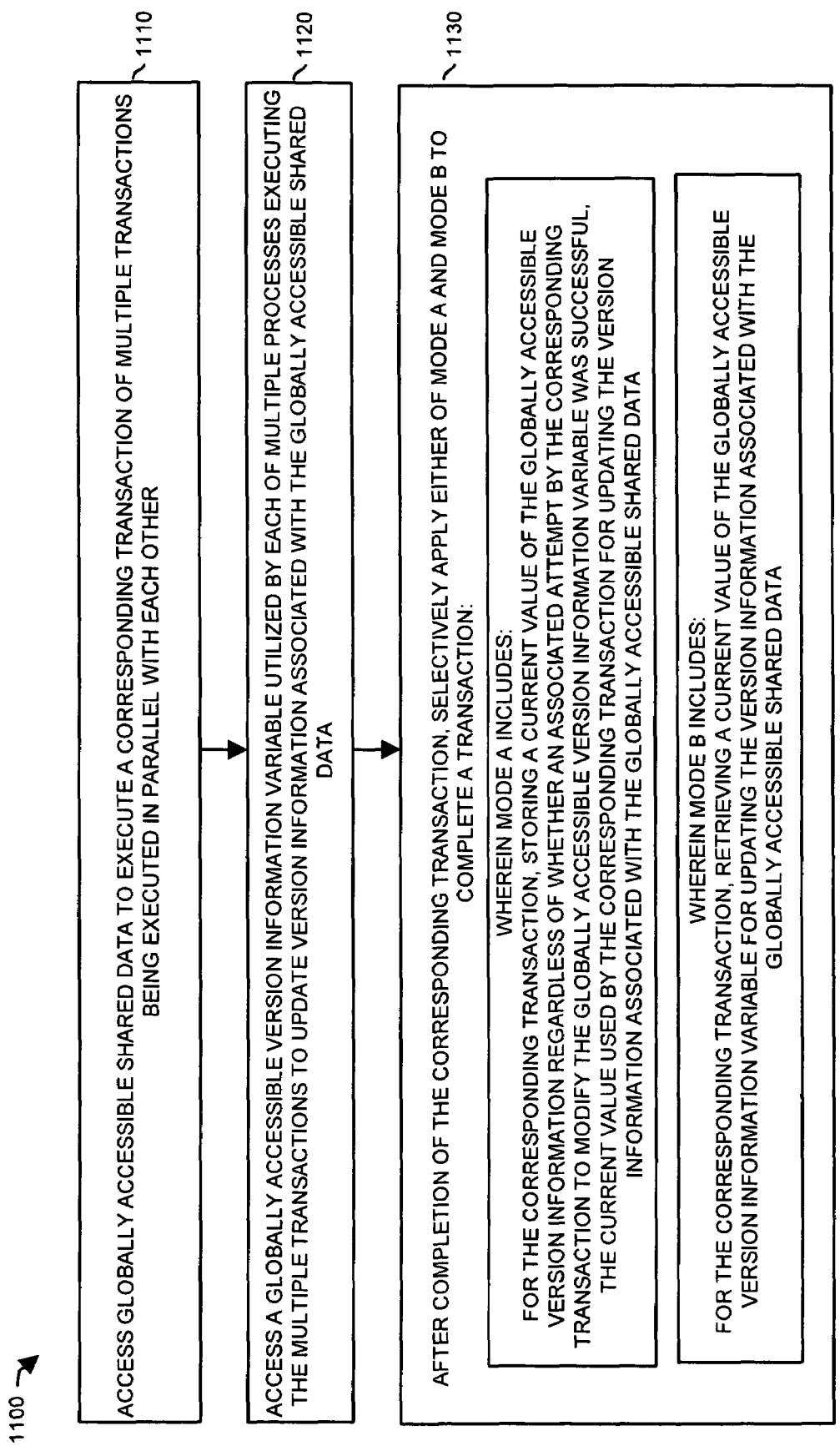
FIG. 11 is a diagram of a flowchart illustrating a technique supporting simultaneous execution of multiple processing threads according to an embodiment herein.

FIG. 11 is a flowchart 1100 illustrating a technique supporting execution of parallel transactions in computer environment 100 according to an embodiment herein. Note that techniques discussed in flowchart 1100 overlap and summarize some of the techniques discussed above.

In step 1110, each of multiple processes 140 accesses globally accessible shared data 125 to execute a corresponding transaction.

In step 1120, each of the multiple processes accesses the globally accessible variable 138 to maintain version information 220 associated with the globally accessible shared data 125.

In step 1130, after completion of a corresponding transaction, selectively apply either mode A or mode B to complete a transaction: i) wherein mode A includes storing a current value of the globally accessible version information regardless of whether an associated attempt by the corresponding transaction to modify the globally accessible version information variable was successful, the current value used by the corresponding transaction for updating the version information associated with the globally accessible shared data, and ii) wherein mode B includes retrieving a current value of the globally accessible version information variable for maintaining the version information associated with the globally accessible shared data.

Description of a Preferred Embodiment

Transactional memory programming has been gaining momentum as the approach of choice for replacing locks in concurrent programming. As described herein, this disclosure introduces different methods associated with transactional locking and a software transactional memory (STM) algorithm based on a combination of commit-time locking and a novel global version-clock based validation technique.

Transactional locking embodiments as described herein potentially improve on state-of-the-art software transactional memories (STMs) in the following ways: i) unlike all other STMs it fits seamlessly with any systems memory life-cycle, including those using malloc/free, ii) unlike all other lock-based STMs it avoids periods of unsafe execution, that is, using its novel version-clock validation, user code is guaranteed to operate only on consistent memory states, and iii) in a sequence of high performance benchmarks, while providing these new properties, it delivered overall performance comparable (and in many cases better than) that of all former STM algorithms, both lock-based and non-blocking. Additionally, transactional locking as described herein delivers the same or nearly the same performance as that of hand-crafted fine-grained concurrent structures. Specifically, transactional locking as described herein can be ten-fold faster than a single lock. These characteristics make transactional locking a viable candidate for deployment of transactional memory today, long before hardware transactional support is available.

I Introduction

A goal of current multiprocessor software design is to introduce parallelism into software applications by allowing operations that do not conflict in accessing memory to proceed concurrently. One tool for designing concurrent data structures has been the use of locks. Unfortunately, coarse grained locking is easy to program with, but provides very poor performance because of limited parallelism. Fine-grained lock-based concurrent data structures perform exceptionally well, but designing them has long been recognized as a difficult task better left to experts. If concurrent programming is to become ubiquitous, researchers agree that one must develop alternative approaches that simplify code design and verification. This disclosure is directed to "mechanical" methods for transforming sequential code or coarse-grained lock-based code into concurrent code. By mechanical we mean that the transformation, whether done by hand, by a preprocessor, or by a compiler, does not require any program specific information (such as the programmer's understanding of the data flow relationships). Moreover, this disclosure focuses on techniques that can be deployed to deliver reasonable performance across a wide range of systems today, yet combine easily with specialized hardware support as it becomes available.

I.I Transactional Programming

As mentioned above, the transactional memory programming paradigm is gaining momentum as the approach of choice for replacing locks in concurrent programming. Combining sequences of concurrent operations into atomic transactions seems to promise a great reduction in the complexity of both programming and verification, by making parts of the code appear to be sequential without the need to program fine-grained locks. Transactions will hopefully remove from the programmer the burden of figuring out the interaction among concurrent operations that happen to conflict with each other. Non-conflicting Transactions will run uninterrupted in parallel, and those that do will be aborted and retried without the programmer having to worry about issues such as deadlock. There are currently proposals for hardware implementations of transactional memory (HTM), purely software based ones, i.e. software transactional memories (STM), and hybrid schemes (HyTM) that combine hardware and software. The dominant trend among transactional memory designs seems to be that the transactions provided to the programmer, in either hardware or software, should be "large scale", that is, unbounded, and dynamic. Unbounded means that there is no limit on the number of locations accessed by the transaction. Dynamic (as opposed to static) means that the set of locations accessed by the transaction is not known in advance and is determined during its execution. Providing large scale transactions in hardware tends to introduce large degrees of complexity into the design. Providing them efficiently in software is a difficult task, and there seem to be numerous design parameters and approaches in the literature, as well as requirements to combine well with hardware transactions once those become available.

1.2 Lock-Based Software Transactional Memory

Closed Memory Systems

Memory used transactionally must be recyclable to be used non-transactionally and vice versa. This is relatively easy in garbage collected languages, but must also be supported in languages like C with standard malloc( ) and free( ) operations. Most existing STMs either require closed memory systems or specialized memory allocators.

Specialized Runtime Environments

Current efficient STMs require special environments capable of containing irregular effects in order to avoid unsafe behavior resulting from their operating on inconsistent states. The TL2 STM system designed according to embodiments herein as discussed above is a novel STM that overcomes both of these limitations: it works with an open memory system, essentially with any type of malloc and free, and it runs user code only on consistent states, eliminating the need for specialized runtime environments.

1.3 Vulnerabilities of STMs

Let us explain the above vulnerabilities in more detail. Current efficient STM implementations require closed memory systems as well as special runtime environments capable of containing irregular effects. Within these environments, they allow the execution of "zombies" transactions that have observed an inconsistent read-set but have yet to abort. The reliance on an accumulated read-set that is not a valid snapshot of the shared memory locations accessed can cause unexpected behavior such as infinite loops, illegal memory accesses, and other run-time misbehavior. The run-time environment absorbs traps, converting them to transaction retries. Handling infinite loops in zombies is usually done by validating transactions while in progress. Validating the read-set on every transactional load would guarantee safety, but would also significantly impact performance. Another option is to perform periodic validations, for example, once every number of transactional loads or when looping in the user code. One conventional system attempts to detect infinite loops by having every n-th transactional object "open" operation validate part of the accumulated read-set. Unfortunately, this policy admits infinite loops (as it is possible for a transaction to read less than n inconsistent memory locations and cause the thread to enter an infinite loop containing no subsequent transactional loads). In general, infinite loop detection mechanisms require extending the compiler. The second issue with existing STM implementations is their need for a closed memory allocation system. For type-safe garbage collected managed runtime environments such as that of the Java programming language, the collector assures that transactionally accessed memory will only be released once no references remain to the object. However, in C or C++, an object may be freed from the transactional space while concurrently executing threads continue to access it. The object's associated lock, if used properly, can offer a way around this problem, allowing memory to be recycled using standard malloc/free style operations. The recycled locations might still be read by a concurrent transaction, but will never be written by one.

1.4 New Results

This disclosure introduces the transactional locking II (TL2) algorithm. TL2 overcomes the drawbacks of all state-of-the-art lock-based algorithms, including our earlier TL algorithm. The new idea in our new TL2 algorithm is to have, perhaps counterintuitively, a global version-clock that is incremented once by each transaction that writes to memory, and is read by all transactions. As we show, this clock can be constructed so that for all but the shortest transactions, the effects of contention on this clock are minimal. All memory locations are augmented with a lock that contains a version number. Transactions start by reading the global version-clock and validating every location read against this clock. This allows us to guarantee at a very low cost that only consistent memory views are ever read. Writing transactions need to collect a read-set but read-only ones do not. Once read and write sets are collected, transactions acquire locks on locations to be written, increment the global version-clock and attempt to commit by validating the read-set. Once committed, transactions write back modified values to memory from the write-set as discussed above, and release the associated locks, updating respective version numbers with the new global version-clock value.

We believe TL2 is revolutionary in that it overcomes most of the safety and performance issues that have dogged high performance lock-based STM implementations. For example, unlike all former lock-based STMs, the techniques herein do not suffer from vulnerabilities related to reading inconsistent memory states, not to mention the fact that former lock-based STMs must use compiler assist or manual programmer intervention to perform validity tests in user code to try and avoid as many of these unsafe behaviors as possible. This safety issue will be a major factor when going from experimental algorithms to actual production quality STMs. Moreover, validation introduced to limit the effects of these safety issues can have a significant impact on overall STM performance.

Additionally, unlike any former STM (including ones that seem to claim they can work with any malloc/free style memory allocation) TL2 allows transactional memory to be recycled into non-transactional memory and back using malloc and free style operations.

As an additional note, concurrent red-black trees derived in a mechanical fashion from sequential code using the TL2 algorithm and providing the above software engineering benefits, tend to perform as well as prior algorithms (and better than them under contention), exhibiting performance in the same ballpark as hand-crafted fine-grained lock-based algorithms, namely, an order of magnitude faster than sequential code made concurrent using a single lock. In summary, TL2's superior performance makes it an ideal candidate for multi-language deployment today, long before hardware transactional support becomes commonly available.

2 Transactional Locking II

The TL2 algorithm we describe herein can be a global version-clock based variant of the transactional locking algorithm. For example, based on this global versioning approach, as opposed to prior localized versioning approaches, we are able to address several safety issues afflicting other lock-based STM systems and simplify the process of mechanical code transformation. In addition, the use of global versioning will hopefully improve the performance of read-only transactions.

Our TL2 algorithm is a two-phase locking scheme that employs commit time lock acquisition mode like the TL algorithm, differing from encounter time algorithms. For each implemented transactional system (i.e. per application or data structure) we have a shared global version-clock variable. We describe it below using an implementation in which the counter is incremented using an increment-and-fetch implemented with a compare-and-swap (CAS) operation. Alternative implementations exist however that offer improved performance. The global version-clock will be read and incremented by each writing transaction and will be read by every read-only transaction. We associate a special versioned write-lock with every transacted memory location. In its simplest form, the versioned write-lock is a single word spinlock that uses a CAS operation to acquire the lock and a store to release it. Since one only needs a single bit to indicate that the lock is taken, we use the rest of the lock word to hold and version number. This number is modified by every successful lock-release. A new element according to embodiments herein is that unlike conventional methods, the new value written in each location will be based on the shared global version-clock variable (e.g., globally accessible variable 138), a property which will provide us with several performance and correctness benefits. To implement a given data structure we allocate a collection of versioned write-locks.

We can use various schemes for associating locks with shared data: per object (PO), where a lock is assigned per shared object, or per stripe (PS), where we allocate a separate large array of locks and memory is striped (divided up) using some hash function to map each location to a stripe. Other mappings between transactional shared variables and locks are possible. The PO scheme requires either manual or compiler-assisted automatic insertion of lock fields whereas PS can be used with unmodified data structures. PO might be implemented, for instance, by leveraging the header words of objects in the Java programming language. A single PS stripe-lock array may be shared and used for different TL2 data structures within a single address-space. For instance an application with two distinct TL2 red-black trees and three TL2 hash-tables could use a single PS array for all TL2 locks. As our default mapping we chose an array of entries of 32-bit lock words with the mapping function masking the variable address with "Ox5FFFFC" and then adding in the base address of the lock array to derive the lock address.

In the following disclosure, we describe the PS version of the TL2 algorithm although most of the details carry through verbatim for PO as well. We maintain thread local read- and writesets as linked lists. The read-set entries contain the address of the lock (and unlike former algorithms does not need to contain the observed version number of the lock). The write-set entries contain the address of the variable, the value to be written to the variable, and the address of the lock that "covers" the variable (in many cases the lock and location address are related and so we need to keep only one of them in the read-set. The write-set can be kept in chronological order to avoid write-after-write hazards.)

2.1 The Basic TL2 Algorithm

We now describe how TL2 executes in commit mode a sequential code fragment that was placed within a TL2 transaction. As we explain, TL2 does not require traps or the insertion of validation tests within user code, and in this mode does not require type-stable garbage collection.

Write Transactions: The following sequence of operations is performed by a writing transaction, one that performs writes to the shared memory. We will assume that a transaction is a writing transaction. If it is a read-only transaction this can be denoted by the programmer, determined at compile time or heuristically at runtime.

1. Sample global version-clock: Load the current value of the global version clock and store it in a thread local variable called the read-version number (RV which is equivalent to RV-value). This value is later used for detection of recent changes to data fields by comparing it to the version fields of their versioned write-locks.

2. Run through a virtual execution: Execute the transaction code (load and store instructions are mechanically augmented and replaced so that virtual execution does not change the shared memory's state, hence the term "virtual".) Locally maintain a read-set of addresses loaded and a write set address/value pairs stored. This logging functionality is implemented by augmenting loads with instructions that record the read address and replacing stores with code recording the address and value to-be-written. The transactional load first checks (potentially based on use of a Bloom filter) to see if the load address already appears in the write-set. If so, the transactional load returns the last value written to the address. This avoids so-called read-after-write hazards. A load instruction sampling the associated lock is inserted before each original load, which is then followed by post-validation code checking that the location's versioned write-lock is free and has not changed. Additionally, we make sure that the lock's version field is <=RV-value and the lock bit is clear. If it is greater than RV-value, it suggests that the memory location has been modified after the current thread performed step 1, and the transaction is aborted.

3. Lock the write set: Acquire the locks in any convenient order using bounded spinning to avoid indefinite deadlock. In case not all of these locks are successfully acquired, the transaction fails.

4. Increment global version-clock: Upon successful completion of lock acquisition of all locks in the write-set perform an increment-and-fetch (using a CAS operation for example) of the global version-clock recording the returned value in a local write-version number variable WV).

5. Validate the read-set: Validate for each location in the read-set that its version number is <=RV. We also verify that these memory locations have not been locked by other threads. In case the validation fails, the transaction is aborted. By re-validating the read-set, we guarantee that its memory locations have not been modified while steps 3 and 4 were being executed. In the special case where RV+1==WV it is not necessary to validate the read-set, as it is guaranteed that no concurrently executing transaction could have modified it.

6. Commit and release the locks: For each location in the write-set, store to the location the new value from the write-set and release the locations lock by setting the version value to the write-version WV and clearing the write-lock bit (this is done using a simple store).

A few things to note. The write-locks have been held for a brief time when attempting to commit the transaction. This helps improve performance under high contention. The Bloom filter allows us to determine if a value is not in the write set and need not be searched for by reading the single filter word. Though locks could have been acquired in ascending address order to avoid deadlock, we found that sorting the addresses in the write set was not worth the effort.

Low-Cost Read-Only Transactions

One of the goals of the proposed methodology's design is an efficient execution of read-only transactions, as they dominate usage patterns in many applications. To execute a read-only transaction:

1. Sample the global version-clock: Load the current value of the global version-clock and store it in a local variable called read-version (RV).

2. Run through a virtual execution: Execute the transaction code. Each load instruction is post-validated by checking that the location's versioned write-lock is free and making sure that the lock's version field is <=RV. If it is greater than RV the transaction is aborted, otherwise commits. As can be seen, the read-only implementation is highly efficient because it does not construct or validate a read-set. Detection of read-only behavior of any given transaction can be done at the method level. This can be done at compile time or by simply running all methods first as read-only, and upon detecting the first transactional write, set a flag to indicate that this method should henceforth be executed in write mode.

2.2 A Low Contention Global Version-Clock Implementation

There are various ways in which one could implement the global version-clock using the algorithm. The difficulty with the global clock implementation is that it may introduce increased contention and costly cache coherent sharing. One approach to reducing this overhead is based on splitting the global version-clock so it includes a version number and a thread identification value. Based on this split, a thread will not need to change the version number if it is different than the version number it used when it last wrote. In such a case all it will need to do is write its own version number in any given memory location. This can lead to an overall reduction by a factor of n in the number of version clock increments.

1. Each version will include the thread id of the thread that last modified it.

2. Each thread, when performing the load/CAS to increment the global version-clock, checks after the load to see if the global version-clock differs from the thread's revious wv (note that if it fails on the CAS and retries the load/CAS then it knows the number was changed). If it differs, then the thread does not perform the CAS, and writes the version clock it loaded and its id into all locations it modifies. If the global version number has not changed, the thread must CAS a new global version number greater by one and its id into the global version and use this in each location.

3. To read, a thread loads the global version-clock, and any location with a version number>RV or =RV and having an id different than that of the transaction who last changed the global version will cause a transaction failure. This has the potential to cut the number of CAS operations on the global version-clock by a linear factor. It does however introduce the possibility of "false positive" failures. In the simple global version-clock which is always incremented, a read of some location that saw, say, value v+n, would not fail on things less than v+n, but with the new scheme, it could be that threads 1 ... n−1 all perform non-modifying increments by changing only the id part of a version-clock, leaving the value unchanged at v, and the reader also reads v for the version-clock (instead of v+n as he would have in the regular scheme). It can thus fail on account of each of the writes even though in the regular scheme it would have seen most of them with values v ... v+n−1.

2.3 Mixed Transactional and Non-Transactional Memory Management

For type-safe garbage collected managed runtime environments such as that of the Java programming language, any of the TL2 lock-mapping policies (PS or PO) are safe, as the GC assures that transactionally accessed memory will only be released once no references remain to the object. However, when using the PO lock scheme in C or C++, having the lock associated with an object reside in the object's header can be dangerous. An object may be freed while concurrently executing threads might continue to access the object's lock.

TL2 uses its PS locking scheme in a novel manner to allow the C programmer to use normal malloc and free operations to manage the lifecycle of structures containing transactionally accessed shared variables. In order to use TL2/PO in C code, one would have to integrate some type of garbage collection (such as conservative garbage collection for C, hazard pointers or Eraser-style Epoch-Based Reclamation) or type-stable storage for the nodes.

Concurrent mixed-mode transactional and non-transactional accesses are proscribed. When a particular object is being accessed with transactional load and store operations it must not be accessed with normal non-transactional load and store operations. (When any accesses to an object are transactional, all accesses must be transactional). In PS mode an object can exit the transactional domain and subsequently be accessed with normal non-transactional loads and stores, but we must wait for the object to quiesce before it leaves. For any given location in an object about to leave the transactional domain, there can be at most one transaction holding the transactional lock, and quiescing means waiting for that lock to be released, implying that all pending transactional stores to the location have been "drained", before allowing the object to exit the transactional domain and subsequently to be accessed with normal load and store operations. Once it has quiesced, the memory can be freed and recycled in a normal fashion, because any transaction that may acquire the lock and reach the disconnected location will fail its read-set validation.

2.4 Mechanical Transformation of Sequential Code

As we discussed earlier, the algorithm we describe can be added to code in a mechanical fashion, that is, without understanding anything about how the code works or what the program itself does. In our benchmarks, we performed the transformation by hand. We do however believe that it may be feasible to automate this process and allow a compiler to perform the transformation given a few rather simple limitations on the code structure within a transaction.

We note that hand-crafted data structures can always have an advantage over TL2, as TL2 has no way of knowing that prior loads executed within a transaction might no longer have any bearing on results produced by transaction.

2.5 Software-Hardware Inter-Operability

Though we have described TL2 as a software based scheme, it can be made inter-operable with HTM systems on several levels. On a machine supporting dynamic hardware transactions, transactions need only verify for each location that they read or write that the associated versioned write-lock is free. There is no need for the hardware transaction to store an intermediate locked state into the lock word(s). For every write they also need to update the version number of the associated stripe lock upon completion. This suffices to provide inter-operability between hardware and software transactions. Any software read will detect concurrent modifications of locations by a hardware writes because the version number of the associated lock will have changed. Any hardware transaction will fail if a concurrent software transaction is holding the lock to write. Software transactions attempting to write will also fail in acquiring a lock on a location since lock acquisition is done using an atomic hardware synchronization operation (such as CAS or a single location transaction) which will fail if the version number of the location was modified by the hardware transaction.

As discussed above, techniques herein are well suited for use in applications such as those that support parallel processing threads in the same processor or in different processors.

However, it should be noted that configurations herein are not limited to such use and thus configurations herein and deviations thereof are well suited for use in other environments as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:
   accessing globally accessible shared data to execute a corresponding transaction of multiple transactions being executed in parallel with each other, the globally accessible shared data accessible by each of the multiple transactions;
   accessing a globally accessible version information variable indicating when the globally accessible shared data was last modified and utilized by each of multiple processes executing the multiple transactions to maintain version information associated with the globally accessible shared data, the globally accessible version information variable accessible by each of the multiple transactions; and
   after completion of the corresponding transaction, initiating at least one of mode A and mode B, wherein mode A includes:
      for the corresponding transaction, storing a current value of the globally accessible version information regardless of whether an associated attempt by the corresponding transaction to modify the globally accessible version information variable was successful, the current value used by the corresponding transaction for maintaining the version information associated with the globally accessible shared data, and
   wherein mode B includes:
      for the corresponding transaction, retrieving a current value of the globally accessible version information variable for maintaining the version information associated with the globally accessible shared data.

2. A method as in claim 1 further comprising:
   utilizing the stored current value of the globally accessible version information variable to update version information associated with the globally accessible shared data even though the associated attempt by the corresponding transaction failed as a result of another transaction attempting to simultaneously modify the globally accessible version information variable.

3. A method as in claim 2, wherein utilizing the stored current value to update the version information occurs after obtaining write locks with respect to corresponding accessed shared data that was modified locally during execution of the corresponding transaction, the write locks preventing other concurrent transactions from modifying the corresponding shared data.

4. A method as in claim 1 further comprising:
   at a start time with respect to execution of the corresponding transaction, storing a current value of a globally accessible version information variable;
   at a commit time with respect to execution of the corresponding transaction, initiating the modification of the globally accessible version information variable.

5. A method as in claim 1, wherein initiating modification of the globally accessible version information variable may occur around a same time as another process attempts to modify the globally accessible version information variable, the initiated modification by the corresponding transaction failing as a result of write contention between the corresponding transaction and another concurrent transaction attempting to modify the globally accessible version information variable at the same time.

6. A method as in claim 1, wherein storing the current value of the globally accessible version information in mode A occurs after failure of the attempt to modify the globally accessible version information variable.

7. A method as in claim 1, wherein mode B further includes:
   initiating modification of the globally accessible version information variable when aborting the corresponding transaction.

8. A method as in claim 1 further comprising:
   selectively switching between initiation of mode A and mode B at an end of each of multiple successive transactions following execution of the corresponding transaction.

9. A method as in claim 8 further comprising:
   monitoring an abort rate associated with the multiple successive transactions;
   initiating selection of mode B to carry out completion of future transactions based on detecting a corresponding low abort rate.

10. A method as in claim 1 further comprising:
    associating a first portion of random values with mode A;
    associating a second portion of random values with mode B;
    initiating generation of a random value; and
    selecting mode A for completing the corresponding transaction if the generated random value is included in the first portion of random values and selecting mode B for completing the corresponding transaction if the generated random value is included in the second portion of random values.

11. A method as in claim 10, wherein allocation of the first portion and the second portion depend on successful completion of multiple transactions.

12. A method as in claim 1, wherein accessing the globally accessible version information variable and accessing the globally accessible shared data includes:
    at a start of the corresponding transaction, storing a current value of the globally accessible version information variable as an RV-value for the corresponding transaction;
    initiating virtual execution of the corresponding transaction based on use of a local read set and write set with respect to the corresponding transaction; and
    after the virtual execution, attempting to commit values in the write set associated with the corresponding transaction to the shared data, the write set including accessed shared data that has been modified locally by the corresponding transaction.

13. A method as in claim 12, wherein attempting to commit the values in the write set includes:
    obtaining a lock over each globally accessible shared variable modified locally as indicated in the write set;

storing data values associated with the write set to corresponding locations in the globally accessible shared data;

releasing obtained locks; and updating globally accessible version information associated with the corresponding locations in the globally accessible shared data.

14. A computer system comprising:

a processor;

a memory unit that stores instructions associated with an application executed by the processor; and an interconnect coupling the processor and the memory unit, enabling the computer system to execute the application and perform operations of:

accessing globally accessible shared data to execute a corresponding transaction of multiple transactions being executed in parallel with each other, the globally accessible shared data accessible by each of the multiple transactions;

accessing a globally accessible version information variable indicating when the globally accessible shared data was last modified and utilized by each of multiple processes executing the multiple transactions to maintain version information associated with the globally accessible shared data, the globally accessible version information variable accessible by each of the multiple transactions; and after completion of the corresponding transaction, initiating at least one of mode A and mode B, wherein mode A includes:

for the corresponding transaction, storing a current value of the globally accessible version information regardless of whether an associated attempt by the corresponding transaction to modify the globally accessible version information variable was successful, the current value used by the corresponding transaction for maintaining the version information associated with the globally accessible shared data, and wherein mode B includes:

for the corresponding transaction, retrieving a current value of the globally accessible version information variable for maintaining the version information associated with the globally accessible shared data.

15. A computer system as in claim 14 further supporting operations of:

utilizing the stored current value of the globally accessible version information variable to update version information associated with the globally accessible shared data even though the associated attempt by the corresponding transaction failed as a result of another transaction attempting to simultaneously modify the globally accessible version information variable; and wherein utilizing the stored current value to update the version information occurs after obtaining write locks with respect to corresponding accessed shared data that was modified locally during execution of the corresponding transaction, the write locks preventing other concurrent transactions from modifying the corresponding shared data.

16. A computer system as in claim 14, wherein mode B further includes:

initiating modification of the globally accessible version information variable when aborting the corresponding transaction.

17. A computer system as in claim 14 further supporting operations of:

selectively switching between initiation of mode A and mode B at an end of each of multiple successive transactions following execution of the corresponding transaction.

18. A computer system as in claim 14, wherein accessing the globally accessible version information variable and accessing the globally accessible shared data includes:

at a start of the corresponding transaction, storing a current value of the globally accessible version information variable as an RV-value for the corresponding transaction;

initiating virtual execution of the corresponding transaction based on use of a local read set and write set with respect to the corresponding transaction; and after the virtual execution, attempting to commit values in the write set associated with the corresponding transaction to the shared data, the write set including accessed shared data that has been modified locally by the corresponding transaction.

19. A computer system as in claim 18, wherein attempting to commit the values in the write set includes:

obtaining a lock over each globally accessible shared variable modified locally as indicated in the write set;

storing data values associated with the write set to corresponding locations in the globally accessible shared data;

releasing obtained locks; and updating globally accessible version information associated with the corresponding locations in the globally accessible shared data.

20. A computer program product including a computer-readable storage medium having instructions stored thereon for processing data information, such that the instructions, when carried out by a processing device, enable the processing device to:

access globally accessible shared data to execute a corresponding transaction of multiple transactions being executed in parallel with each other, the globally accessible shared data accessible by each of the multiple transactions;

access a globally accessible version information variable indicating when the globally accessible shared data was last mofified and utilized by each of multiple processes executing the multiple transactions to maintain version information associated with the globally accessible shared data, the globally accessible version information variable accessible by each of the multiple transactions; and after completion of the corresponding transaction, initiating at least one of mode A and mode B, wherein mode A includes:

for the corresponding transaction, storing a current value of the globally accessible version information regardless of whether an associated attempt by the corresponding transaction to modify the globally accessible version information variable was successful, the current value used by the corresponding transaction for maintaining the version information associated with the globally accessible shared data, and wherein mode B includes:

for the corresponding transaction, retrieving a current value of the globally accessible version information variable for maintaining the version information associated with the globally accessible shared data.

\* \* \* \* \*